United States Patent
Smith

(10) Patent No.: US 7,836,490 B2
(45) Date of Patent: Nov. 16, 2010

(54) METHOD AND APPARATUS FOR PROVIDING NETWORK SECURITY USING SECURITY LABELING

(75) Inventor: Michael R. Smith, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1466 days.

(21) Appl. No.: 10/696,629

(22) Filed: Oct. 29, 2003

(65) Prior Publication Data

US 2005/0097357 A1    May 5, 2005

(51) Int. Cl.
    *G06F 21/00*    (2006.01)
    *H04L 29/06*    (2006.01)

(52) U.S. Cl. .......................................... 726/4; 726/13

(58) Field of Classification Search ...................... 726/3, 726/6, 11, 13, 4; 370/392; 707/1, 9, 10; 709/238

See application file for complete search history.

(56) References Cited

U.S. PATENT DOCUMENTS

| | | | |
|---|---|---|---|
| 4,922,486 A | 5/1990 | Lidinsky et al. | 370/60 |
| 5,017,917 A | 5/1991 | Fisher | 340/14.1 |
| 5,113,442 A | 5/1992 | Moir | 713/167 |
| 5,251,205 A | 10/1993 | Callon et al. | 370/60 |
| 5,615,264 A | 3/1997 | Kazmierczak | 705/52 |
| 5,764,762 A | 6/1998 | Kazmierczak | 705/52 |
| 5,787,427 A | 7/1998 | Benantar et al. | 707/9 |
| 5,845,068 A * | 12/1998 | Winiger | 726/3 |
| 5,911,143 A | 6/1999 | Deinhart et al. | 707/103 |
| 5,941,947 A | 8/1999 | Brown | 709/225 |
| 5,968,177 A | 10/1999 | Batten-Carew et al. | 726/4 |
| 6,014,666 A | 1/2000 | Helland | 707/9 |
| 6,023,765 A | 2/2000 | Kuhn | 726/4 |
| 6,088,659 A | 7/2000 | Kelley et al. | |
| 6,092,191 A | 7/2000 | Shimbo et al. | |
| 6,202,066 B1 | 3/2001 | Barkley et al. | 707/9 |
| 6,212,558 B1 * | 4/2001 | Antur et al. | 709/221 |

(Continued)

FOREIGN PATENT DOCUMENTS

EP    0465016 A2    6/1991

(Continued)

OTHER PUBLICATIONS

IEEE Standard for Information Technology-Telecommunications and Information Exchange Between Systems-Local and Metropolitan Area Networks-Common Specifications, *Part 3: Media Access Control (MAC) Bridges*, ANSI/IEEE Std. 802.1D, 1998 Edition, Dec. 10, 1998, pp. 1-355.

(Continued)

*Primary Examiner*—Gilberto Barron, Jr.
*Assistant Examiner*—Abdulhakim Nobahar
(74) *Attorney, Agent, or Firm*—Campbell Stephenson LLP; Samuel G. Campbell, III

(57) ABSTRACT

A method and apparatus for providing network security using security labeling is disclosed. The method includes comparing first security level information and second security level information, and indicating processing to be performed on the packet based on the comparing. The first security level information is stored in a security label of a packet received at a network node, while the second security level information is stored at the network node.

95 Claims, 14 Drawing Sheets

U.S. PATENT DOCUMENTS

| | | | |
|---|---|---|---|
| 6,233,618 B1 | 5/2001 | Shannon | 709/229 |
| 6,289,462 B1 * | 9/2001 | McNabb et al. | 726/21 |
| 6,292,798 B1 | 9/2001 | Dockter | 707/9 |
| 6,292,900 B1 * | 9/2001 | Ngo et al. | 726/6 |
| 6,304,973 B1 | 10/2001 | Williams | 713/201 |
| 6,405,259 B1 | 6/2002 | Cheston et al. | 709/245 |
| 6,449,643 B1 | 9/2002 | Hyndman | 709/223 |
| 6,711,172 B1 | 3/2004 | Li | 70/401 |
| 6,754,214 B1 | 6/2004 | Mahalingaiah | 370/392 |
| 6,823,462 B1 | 11/2004 | Cheng et al. | |
| 6,973,057 B1 * | 12/2005 | Forslow | 370/328 |
| 6,985,948 B2 | 1/2006 | Taguchi et al. | 709/225 |
| 7,000,120 B1 | 2/2006 | Koodli et al. | |
| 7,032,243 B2 | 4/2006 | Leerssen et al. | 726/17 |
| 7,136,374 B1 | 11/2006 | Kompella | |
| 7,207,062 B2 | 4/2007 | Brustoloni | |
| 7,284,269 B2 | 10/2007 | Marquet et al. | |
| 7,350,077 B2 | 3/2008 | Meier et al. | |
| 7,417,950 B2 | 8/2008 | Hefmeister et al. | 370/230 |
| 7,437,755 B2 | 10/2008 | Farino et al. | |
| 7,506,102 B2 | 3/2009 | Lev-Ran et al. | |
| 7,530,112 B2 | 5/2009 | Smith | 726/28 |
| 2002/0026592 A1 | 2/2002 | Gavrila et al. | 713/201 |
| 2002/0035635 A1 * | 3/2002 | Holden et al. | 709/230 |
| 2002/0184521 A1 | 12/2002 | Lucovsky et al. | 713/200 |
| 2003/0051155 A1 * | 3/2003 | Martin | 726/11 |
| 2003/0088786 A1 | 5/2003 | Moran et al. | 713/201 |
| 2003/0110268 A1 | 6/2003 | Kermarec et al. | 709/227 |
| 2003/0140246 A1 | 7/2003 | Kammer et al. | 713/201 |
| 2003/0145232 A1 | 7/2003 | Poletto et al. | 726/22 |
| 2003/0154400 A1 | 8/2003 | Pirttimaa et al. | 713/201 |
| 2004/0017816 A1 | 1/2004 | Ishwar et al. | 370/395.53 |
| 2004/0044908 A1 | 3/2004 | Markham et al. | 713/201 |
| 2004/0064688 A1 | 4/2004 | Jacobs | |
| 2004/0156313 A1 | 8/2004 | Hofmeister et al. | 370/229 |
| 2004/0160903 A1 | 8/2004 | Gai et al. | 370/254 |
| 2004/0181690 A1 * | 9/2004 | Rothermel et al. | 726/6 |
| 2004/0202171 A1 | 10/2004 | Hama | 370/395.1 |
| 2004/0264697 A1 | 12/2004 | Gavrilescu et al. | 380/255 |
| 2004/0268123 A1 | 12/2004 | Le et al. | |
| 2005/0055573 A1 | 3/2005 | Smith | 713/201 |
| 2005/0129019 A1 | 6/2005 | Cheriton | 370/392 |
| 2005/0177717 A1 | 8/2005 | Grosse | 713/160 |
| 2005/0190758 A1 | 9/2005 | Gai et al. | 370/389 |
| 2005/0198412 A1 * | 9/2005 | Pedersen et al. | 710/30 |
| 2006/0010483 A1 | 1/2006 | Buehler | 726/1 |
| 2006/0090208 A1 | 4/2006 | Smith | 726/26 |
| 2006/0106750 A1 | 5/2006 | Smith | 707/1 |
| 2006/0112425 A1 | 5/2006 | Smith et al. | 726/13 |
| 2006/0112426 A1 | 5/2006 | Smith et al. | 726/13 |
| 2006/0112431 A1 | 5/2006 | Finn et al. | |
| 2006/0117058 A1 | 6/2006 | Smith | |
| 2007/0094716 A1 | 4/2007 | Farino et al. | |
| 2009/0049196 A1 | 2/2009 | Smith et al. | |
| 2009/0097490 A1 | 4/2009 | Sanderson et al. | |

FOREIGN PATENT DOCUMENTS

| | | | | |
|---|---|---|---|---|
| EP | 0 697 662 A1 | 2/1996 | | 12/14 |
| EP | 0849680 A2 | 12/1997 | | |
| EP | 1067745 A2 | 11/1999 | | |
| JP | 2002 164937 | 6/2002 | | |
| WO | WO 2005/027464 | 3/2005 | | |

OTHER PUBLICATIONS

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Wang, Ning and Pavlou, George, Scalable Sender Access Control for Bi-directional Multicast Routing, Computer Networks, Elsevier Science Publishers B.V., vol. 43, No. 5, Dec. 5, 2003, pp. 539-555.

Islam, An Access Control Method with Subject-Object Key and Time Stamp, Jun. 2003, Malaysian Journal of Computer Science, vol. 16, No. 1, pp. 77-83.

Barkley et al, Supporting Relationships in Access Control Using Role Based Access Control, Jul. 1999.

Pfleeger et al., Security in Computing, 2003, Prentice Hall, 3$^{rd}$ Edition, pp. 194-207.

Valenzi, Kathleen D., Digital Signatures: An Important "Sign" of the Future of E-Government Copyright 2000 The Rector and Board of Visitors of the University of Virginia, 6 pages.

Microsoft Computer Dictionary, Fifth Edition, Pub Date: May 1, 2002, Excerpt of terms: digital signature—digital signature standard & routable protocol—routing table, p. 656.

CDAT Overview, http: www.cisco.com/universalcd/cc/td/doc/, Solution/sesm/sesm_313toolguid/chi1_overview.htm. Copyright 1992-2002 Cisco Systems, Inc.

Stevens, Richard W., TCP/IP Illustrated vol. 1, The Protocols, Copyright © 1994 Addison Wesley Longman, Inc., pp. 112-117.

* cited by examiner

METHOD AND APPARATUS FOR PROVIDING NETWORK SECURITY USING SECURITY LABELING

BACKGROUND OF THE INVENTION

1. Field of the Invention

This invention relates to the field of information network security, and more particularly relates to a method and apparatus for securing network communications through the use of a security label.

2. Description of the Related Art

Today's networks are an efficient and effective platform for providing communications between large numbers of computing devices. Each device on the network has easy access to the information and services provided by the other networked devices. The convenience of access, however, significantly increases the risk of an outside attack on one or more of these network devices. Network security is therefore of increasing importance.

Complicating the problem is the flexibility provided by network access technologies such as wireless, Dynamic Host Configuration Protocol (DHCP), virtual private network (VPN) gateways and the like, which allow users access to a given protected network from a variety of access or entry points. This is true of all manner of networks, including enterprise networks, service provider networks and the like. The security afforded while providing such access is therefore of increasing concern. Technologies based on Remote Authentication Dial-In User Service (RADIUS), Terminal Access Controller Access Control System (TACACS), the DIAMETER protocol and other protocols allow a user to be authenticated upon entry to the network.

As is known, communications paths across such networks are conceptually separate (e.g., can be viewed as separate virtual paths), although they may traverse some or all of the same network devices (i.e., physical segments), and so are controlled separately using, for example, access control lists (ACLs). Conventionally, constraints upon access enjoyed by network users are enforced by ACLs, which are used to process packets and so control the network traffic of such users. For scalability and manageability, conventional ACLs require the mapping of a user host address (as the source of the given packet(s); for example, an internet protocol (IP) address) to be relatively static, or the security policy be sufficiently lax to allow for all possible addresses for the user.

Today's security ACLs suffer from a number of infirmities. These ACLs are conventionally applied to a given interface and contain IP addresses which tie the security policy directly to the network topology. As a result, a change in the network such as repartitioning of subnets causes the security policy to be revisited. Moreover, it would appear that ACLs in various parts of the network would need to be updated each time a user authenticated to the network, in order to add rules associated with the source IP address assigned to this user's host, which would be specific to that user. This would cause a huge increase in the number of unique ACLs and dramatically increase the rate at which such rules would have to be updated.

Within a given ACL, there also exists the problem of dramatic increases in size resulting from the expression of individual IP addresses, where the number of entries is often the number of source addresses multiplied by the number of destination addresses, multiplied by the number of permissions. Thus, the addition of a single individual IP address can have a significant impact on the size of a substantial number of ACLs.

When a customer changes the network topology, the ACLs must be reexamined. Since such ACLs can quite easily reach several hundred or even several thousand of lines in length, such a reexamination can be non-trivial, to say the least. Due to the complexity of such an ACL, the confidence in the changes that are made is not very high, typically, and the ACLs often require extensive testing by the user before being placed in a production environment. Moreover, because platforms using content-addressable memories (CAMs) to implement ACLs require recompiling of some or all of the ACLs when any change is made, the increases in processing cost can be quite severe, approaching a quadratic in the number of users. These increases in complexity increase the chance of a network outage, a security hole, or both. A single ACL stretches a user's ability to manage their security policy. Placing such ACLs throughout the enterprise network therefore impacts the manageability of today's networks. Given the foregoing, particularly in light of the increasingly flexible access that is required now and will be required in the future, relying on existing ACL-based solutions is difficult.

What is required, then, is a mechanism that allows for the efficient identification of network traffic. Preferably, such an approach should address limitations encountered in the use of existing ACL technology. Also preferably, such an approach should allow the network to be easily reconfigured and grow, without incurring a disproportionate administrative burden or consuming inordinately large amounts of network resources.

SUMMARY

In one embodiment, a method for providing network security using security labeling is disclosed. The method includes comparing first security level information and second security level information, and indicating processing to be performed on the packet based on the comparing. The first security level information is stored in a security label of a packet received at a network node, while the second security level information is stored at the network node.

In another embodiment, a network device is disclosed. The network device includes a network interface. The network interface is configured to receive a packet. The network device is configured to store first security level information and to process the packet using the first security level information.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
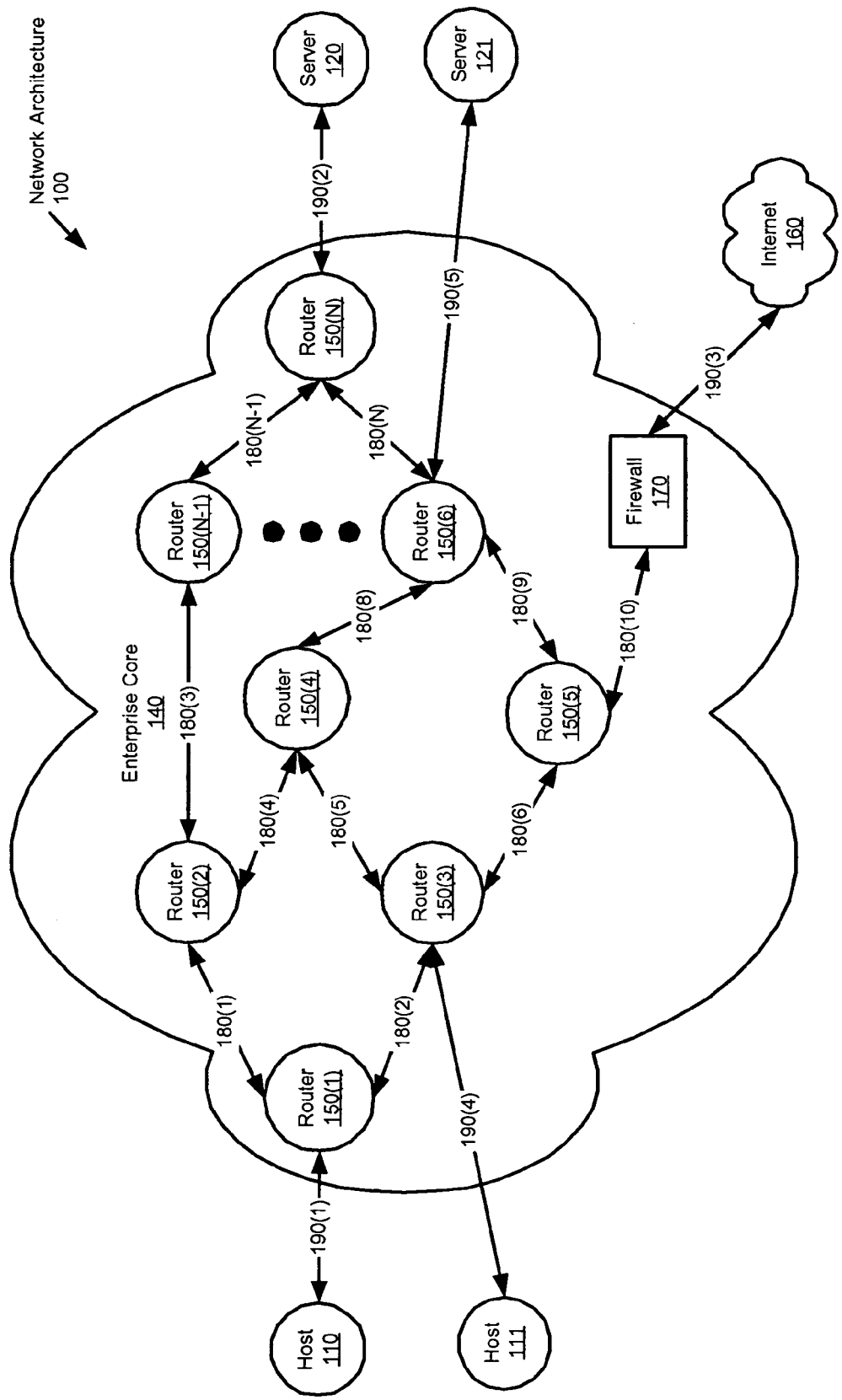
FIG. 1 is a diagram illustrating an example of a network architecture, including a host and a server, in which the present invention can be practiced.

The following is intended to provide a detailed description of an example of the invention and should not be taken to be limiting of the invention itself. Rather, any number of variations may fall within the scope of the invention which is defined in the claims following the description.

Introduction

The invention provides a method and apparatus that secures network communications through the addition of security information in the form of a security label to the packets conveyed using this method. After authenticating a user on a given network access port through an authentication protocol (e.g., Institute of Electrical and Electronics Engineers (IEEE) Standard 802.1X-2001), the authentication server can provide the network device (e.g., a layer 2 switch) with security information in the form of a security label for the access port. This security label is then used to tag packets coming from the host using a security label field (e.g., encapsulation that can be supported, for example, using IEEE Standard 802.10-1998). At the egress network access port, the packet's security information (i.e., security label) is compared to security information for the egress port (the security level of the egress port). At this point, a decision as to the handling of the packet can be made based on this comparison. For example, a decision can be made as to whether to permit or deny access to the packet. Thus, if the packet's security level is higher than the port receiving the packet, the packet can be dropped, for example. Alternatively, if a range of security levels is supported by the port, the packet can be dropped if the packet's security level is not within the range of security levels.

Described herein is a security label pruning protocol for networks employing security packet labeling. In one embodiment, a security label pruning protocol according to the present invention is implemented as a generic attribute registration protocol (GARP) security label registration protocol (GSRP). As its name implies, such an implementation of the protocol employs features of the generic attribute registration protocol (GARP), as described in ANSI/IEEE Standard 802.1D, 1998 Edition, Sections 12 (Generic Attribute Registration Protocol (GARP)) and 13 (Example "C" code implementation of GARP), which are included by reference herein, in their entirety and for all purposes.

GSRP runs independently of other protocols (including other GARP-based protocols), and in doing so, minimizes interference with other protocols employing GARP. Moreover, packets tagged according to the present invention are able to seamlessly pass through non-GSRP-aware network devices (e.g., switches). In one embodiment, GSRP utilizes a single GARP information propagation (GIP) context for each spanning tree (e.g., as defined by IEEE 802.1D-1998). In the typical scenario, access links carry unlabeled packets and inter-switch (backbone) links carry labeled packets. Labeled packets present on the access links are dropped, redirected, or have their security labels rewritten subject to management control.

In one embodiment, the information contained in the security label is formatted according to Federal Information Processing Standards Publication 188 (FIPS PUB 188, entitled "Standard Security Label for Information Transfer," dated Sep. 6, 1994, which is included by reference herein, in its entirety and for all purposes), for example. Using such label formats, GSRP can be configured to use one of several label formats defined in FIPS PUB 188 (which include a restrictive bitmap type, an enumerated type, a range type, a permissive bitmap type and a "free form" type (which allows user-defined data)). The two formats described therein correspond to two different types of security labels: an enumerated security label (relating to a multi-level security paradigm such as that used by the military) and a bitmap security label (relating to a multilateral security paradigm such as that used in trusted computing).

When using the enumerated security label, each link has an associated minimum and maximum security label associated therewith. The minimum security label is the minimum security level of a packet that the authenticated entity wishes to receive. The maximum security label is the maximum security level of a packet that the authenticated entity is allowed to receive. Each GSRP client issues a join request (e.g., per the GARP protocol) for the minimum and the maximum security label of the client. The minimum and maximum security label is encoded as two different attribute types (again, per the GARP protocol). The join request is issued on each GIP context that the particular host resides. Since the GIP context is associated with a spanning tree, a host may not know the VLAN-to-spanning tree binding. In such a case, the host can transmit join requests on each VLAN to which the host belongs. On a spanning tree-aware network device (e.g., switch), this will cause a single GID registration for the attribute.

At the network edge, this spanning tree-aware network device is either a GSRP-enabled host running a trusted operating system, or a secure network device (e.g., a secure network switch) acting on behalf of the host, subsequent to local authentication using an authentication protocol such as 802.1X. The following discussion is in terms of switching at the subnetwork level (e.g., layer 2), but it will be appreciated that the techniques discussed are applicable in a much wider variety of scenarios.

Although a given inter-switch link contains multiple GID registrations for various security labels, it is the responsibility of the GSRP application to apply the minimum and maximum security label to the attached network segment. The minimum security label of each port on a GSRP enabled switch is the lowest security label registration received by the GID registrar on that particular port. The maximum security label of each port on a GSRP-enabled switch is the highest security label registration received by the GID registrar on that particular port. When 802.1Q VLAN tagging is used on the inter-switch links (802.1Q trunks), the minimum and maximum security labels are assigned to the {port, VLAN} pair. When shared network segments are present in a GIP context, the GID applicant only sends a join request if the minimum security label joined on the network segment is higher than the minimum security label for which the GID applicant wishes to apply. Likewise, the GID applicant only sends a join request if the maximum security label joined on the network segment is lower than the maximum security label for which the GID applicant wishes to apply.

In the second of the two formats (e.g., when using the bitmap security label), each link has an associated security label bitmap. Each GSRP client issues a join request (again, per the GARP protocol) for the desired security label bitmap. Propagation occurs in the same manner as for the enumerated security label. The main difference is that the behavior on the inter-switch link. A given inter-switch link will contain multiple GID registrations for various security label bitmaps. The GSRP application is responsible for ORing all of the security label bitmaps received by the GID registrar on that particular port.

It will be appreciated that other approaches can be employed to accomplish the control over packet security using the present invention. For example, authentication can also be applied to the GSRP PDUs using IEEE 802.10 encapsulation. In this embodiment, a bridge can act as an IEEE 802.10 multicast group, and a single shared key used for authentication.

The present invention provides a number of advantages. A protocol according to the present invention moves security based on security labeled packets from the egress edge of the network deeper into the core and closer to the originator of the traffic. This improves overall security of the network, reduces the potential leakage of classified traffic from intended paths, provides some protection against distributed denial of service attacks, and improves the available network bandwidth. Moreover, although examples provided herein are specific to IEEE 802.10 security labeled packets, it will be appreciated that a protocol of the present invention can be used for the pruning of any form of security labeled packets.

Example of a Network Implementing Security Labeling

FIG. 1 is a block diagram illustrating an example of a network architecture 100, including hosts 110 and 111, and servers 120 and 121, in which the present invention can be practiced. Host 110 and server 120 communicate with one another via an enterprise core network 140. Enterprise core network 140 includes a number of network devices, but for the sake of simplicity, is shown as including a number of routers (depicted in FIG. 1 as routers 150 (1)-(N)), interconnected to one another. In order to allow the users of enterprise core network 140 to access computers outside of the enterprise, enterprise core network 140 communicates with an internet 160 via a firewall 170. Access to firewall 170 (and so internet 160) is provided at one of routers 150(1)-(N) (router 150(5), for example).

It will be noted that the links between ones of routers 150(1)-(N) (depicted as links 180(1)-(N)) can be made secure through the use of a technique according to embodiments of the present invention. However, as will be appreciated, links outside enterprise core network 140 (e.g., links 190(1)-(4)) are not (necessarily) secure from the perspective of packet security. It will also be appreciated that, in certain embodiments, communications (e.g., those between server 121 and router 150(6)) can be made secure by running a trusted operating system on the given server (e.g., server 121), and labeling the packets according to the present invention (a scenario in which server 121 is referred to as a "trusted server"). In such a case, the link coupling the router and server (e.g., a link 190(5)) is considered a security trunk port.

It will be noted that the variable identifier "N" is used in several instances in the figures described herein to more simply designate the final element of a series of related or similar elements (e.g., routers 150 (1)-(N) and links 180(1)-(N)). The repeated use of such variable identifiers is not meant to necessarily imply a correlation between the sizes of such series of elements, although such correlation may exist. The use of such variable identifiers does not require that each series of elements have the same number of elements as another series delimited by the same variable identifier (e.g., routers and links). Rather, in each instance of use, the variable identified by "N" (or any other such identifier) may hold the same or a different value than other instances of the same variable identifier.

Figure 2:
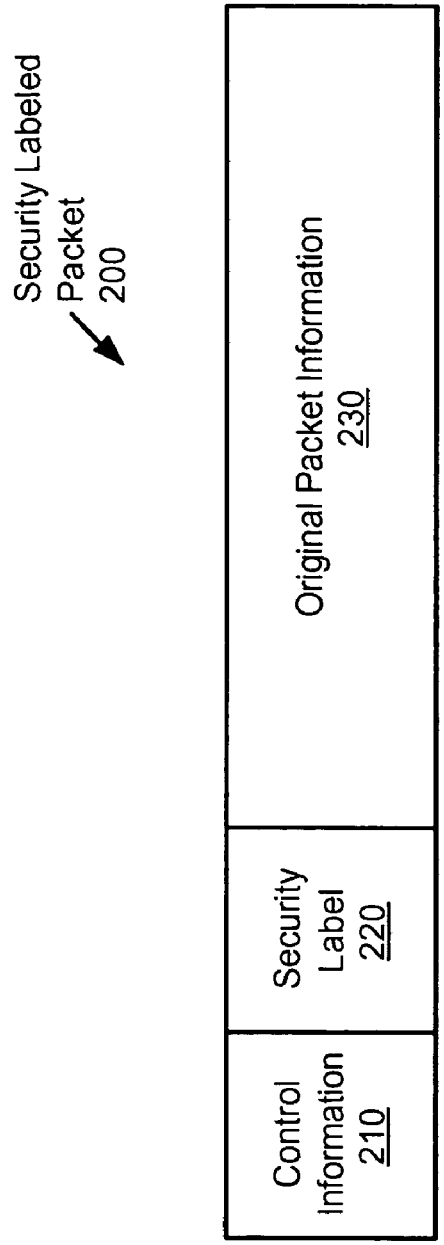
FIG. 2 is a block diagram illustrating a packet according to embodiments of the present invention.

FIG. 2 is a block diagram illustrating security labeled packet 200 according to embodiments of the present invention. Security labeled packet 200 includes control information 210, a security label 220 and original packet information 230. Original packet information 230 includes the information that had been originally transmitted as the network packet to be delivered to the destination. Control information 210 and security label 220 are added by embodiments of the present invention in order to allow the secure conveyance of the information contained in the original packet (e.g., original packet information 230).

Security label 220 indicates the security level of the user, host, or other network entity/device originating a packet. Control information 210 contains information regarding previous network operations on packet (e.g., indications that packet has been firewalled, packet to SMTP port had antivirus applied and the like), as well as desired actions to be performed on the packet (e.g., Accelerated Feature Switching (AFS), Quality of Security Service (QoSS) information, classification tags to accelerate security appliances (e.g., indication as to internally/externally sourced traffic), information for use by distributed security appliances, and the like). It will be appreciated that such information can also be reflected directly in the information included in security label 220.

Security labeled packet 200 traverses enterprise core network 140 via transmission between various ones of routers 150(1)-(N). For example, a packet transmitted by host 110, and destined for server 120, is received by router 150(1) via link 190(1), conveyed via ones of routers 150(2)-(N−1) (not necessarily inclusive), and is provided to server 120 by router 150(N) via link 190(2). Links 180(1)-(N) are referred to herein as security trunks (and so the ports coupled to such security trunks are referred to as security trunk ports). When packets are conveyed over a security trunk, all such packets are security labeled, and unlabeled packets are either redirected or dropped. In a similar fashion, a port of one of routers 150(1)-(N) coupled to an unsecured computer (e.g., via one of links 180(1)-(3)) is referred to herein as a security access port. At a security access port, no packets have security labeling, and so labeled packets are either redirected, dropped or their label is removed or rewritten. An example of a security access port would be the port on router 150(1) coupled to host 110.

In such a scenario, a user is authenticated to the directly connected network device (e.g., a switch or router), using an appropriate media-based authentication protocol (e.g., IEEE 802.1X, IEEE P802.11i/D3.0, Point-to-Point Protocol (PPP), biometrics or the like). In the process of authentication, the responsible authentication server informs the network device of the appropriate security level to assign to the port to which the user being authenticated is coupled. It will be noted that, in a given network, the network's security policy will define the security level and, potentially, the scope of security association (e.g., for this[phy port], [MAC, phy port], [IP address, phy port] or the like).

As will be appreciated, such authentication can only occur on ports that have been marked as security access ports. As noted earlier, packets on security access ports are not expected to have security labeling, because such packets have been received from unsecured source (at least, from the perspective of a technique according to the present invention), and so do not contain the appropriate security labeling. As also noted, packets including security labeling received on security access ports are typically dropped as a result of their having been labeled. It will also be noted that, typically, the authentication discussed earlier is only performed at the network edge (e.g., at router 150(1)), and not between network devices (e.g., routers 150(1)-(N)).

Once labeled, network traffic from a given security trunk port is allowed to flow onto enterprise core network 140. Each packet coming from the security trunk port is tagged with a security label indicating, at a minimum, the security level of the user sourcing that packet. As such a packet traverses enterprise core network 140, policies within enterprise core network 140 (as implemented on routers 150(1)-(N)) are applied based on the security label of the packet, in a manner similar to access control lists.

However, rather than being based on a network address, the policies are implemented based on the security levels of the various entities within the network. It will be appreciated that, while such policies are likely to be applied to an egress point (e.g., router 150(N)), this is not mandatory. Such policies can be pushed into enterprise core network 140, and so applied by the network devices therein (routers 150(1)-(N−1)), or at the ingress point (e.g., router 150(1)).

A wide variety of such security policies can be imagined. For example, a network device can be configured to stop packets intended for devices beyond the original user's security level. In another example, all security levels might be allowed to talk to a given server, but with the packets having a security level lower than a given value being sent through a firewall. Moreover, security policies can be implemented that prevent hosts from obtaining higher security levels. Thus, even if a host such as host 110 were to be co-opted, other systems with higher security levels would remain safe as a result of the inability to change the traffic's security level. As will be appreciated, when computers using trusted operating systems are used in combination with a network configured according to the present invention, the multi-level security capabilities are distributed across the network, and result in what can be viewed as a "trusted network".

Figure 3:
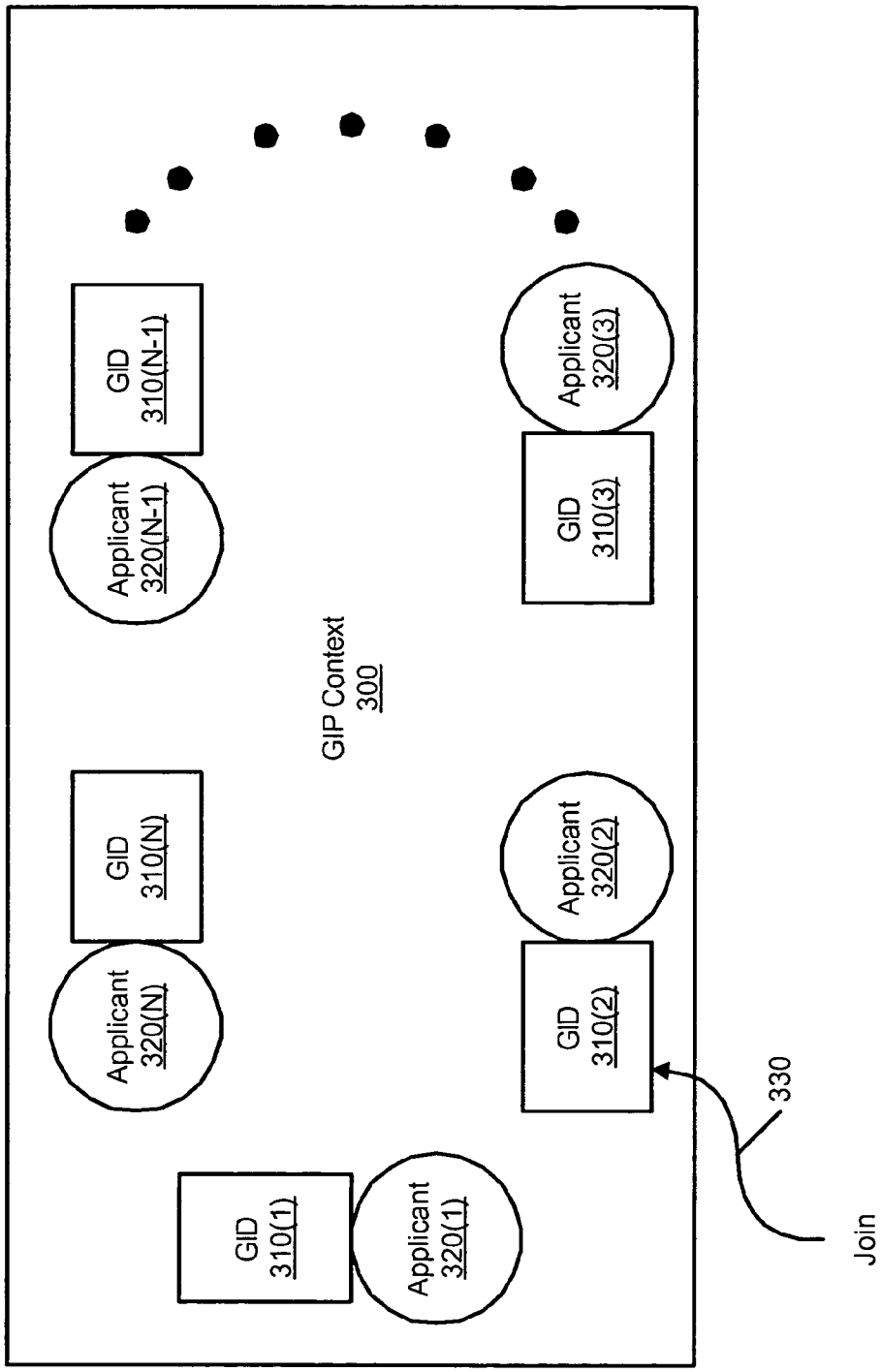
FIG. 3 is a block diagram illustrating a context according to embodiments of the present invention.

FIG. 3 is a block diagram illustrating a generic attribute registration protocol (GARP) information propagation (GIP) context 300. Within GIP context 300, there are included a number of GARP information declarations (depicted as GARP information declarations (GIDs) 310(1)-(N)), and respectively associated therewith, a number of applicants (depicted as applicants 320(1)-(N)). GID 310(2) is subject to a join operation (depicted as a join request 330).

According to one embodiment of the present invention, a GIP context such as GIP context 300 is used on a per-spanning-tree-basis (an aspect which is discussed in connection with FIGS. 4 and 5). In the setting of FIG. 3, a join (e.g., join 330) is sent only if the minimum security level of the host/server joining is lower than that already recorded by the applicant's associated registrar, or if the maximum security level is higher than that previously joined. Thus, for each port, there are two different attribute types: minimum security label and maximum security label. The maximum security level of a given port is that of the highest security level received by the GID registrar (not shown). The minimum security level of that port is that of the lowest security level received by the GID registrar. The bitmap of the port is thus the logical OR of the security bitmaps received on that port. Once this minimal information is defined (or a default employed), the port is then able to properly handle GSRP packets.

In a IEEE standards-based network, GSRP packets (also referred to herein as protocol data units (PDUs)) can be authenticated via IEEE 802.10 encapsulation, for example. As noted, in such a scenario, bridges can be configured to act in a manner similar to that of an IEEE 802.10 multicast group. It will also be appreciated that, if security trunk ports are also VLAN (i.e., IEEE 802.1 Q-1998) trunk ports, the minimum/maximum label is assigned on a per {port, VLAN} basis.

Figure 4:
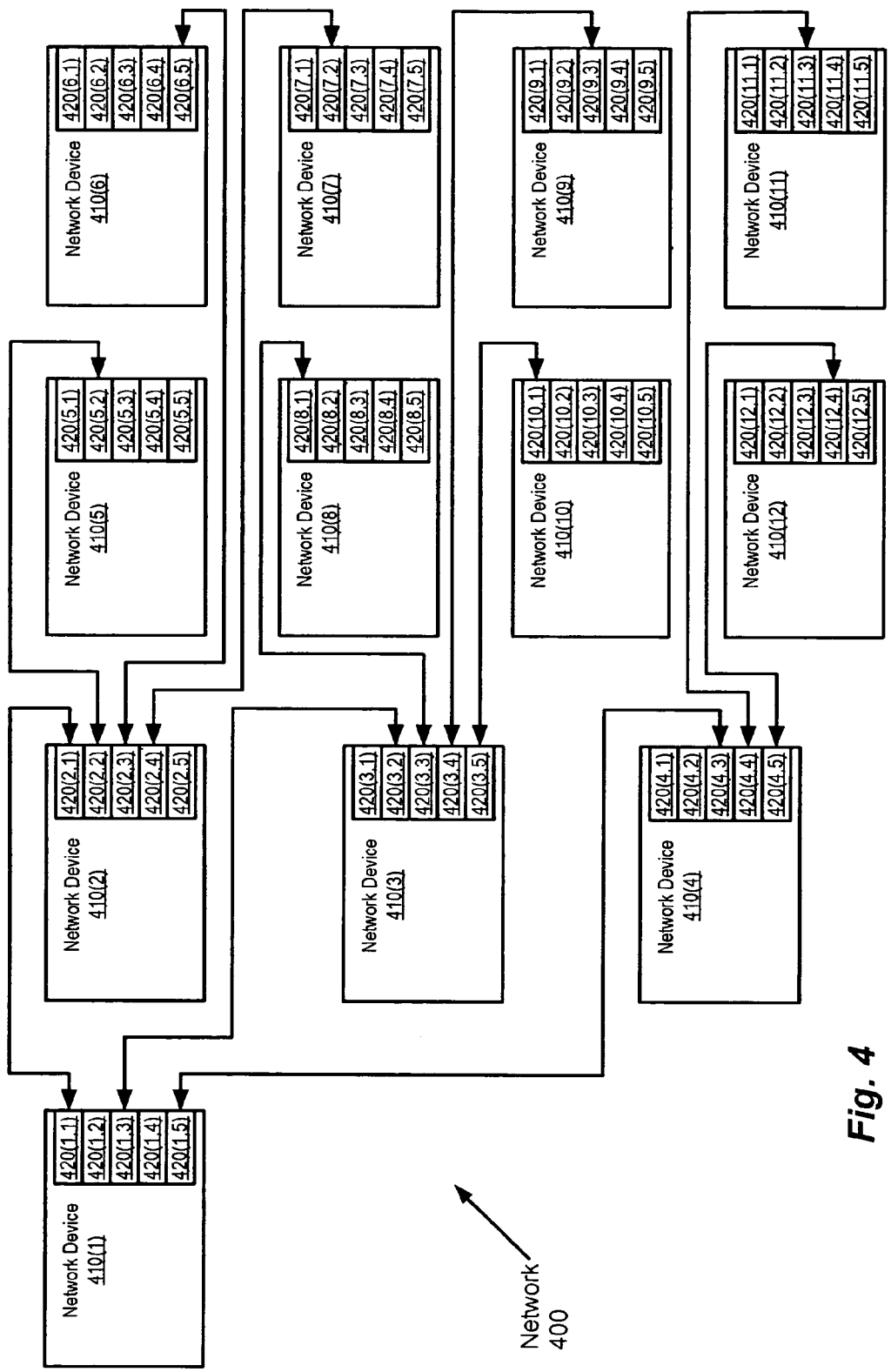
FIG. 4 is a diagram illustrating a network according to embodiments of the present invention.

FIG. 4 is a block diagram illustrating a network 400 according to embodiments of the present invention. Network 400 includes a number of network devices (depicted as network devices 410(1)-(12)). As will be understood by one of skill in the art, network devices 410(1)-(12) are merely examples of network devices that could be used to fashion network 400. As will be appreciated, one example of such network devices is a router. As can be seen, each of network devices 410(1)-(12) includes a number of ports (depicted in FIG. 4 as ports 420(1,1)-(12,5)). While each of network devices 410(1)-(12) is shown as including five ports, it will be appreciated that network devices 410(1)-(12) could have a larger number of ports, or fewer ports. It will also be appreciated that the connections between ports 420(1,1)-(12,5) shown in FIG. 4 are merely an example of the many possible arrangements such couplings might take.

In the case in which an enumerated security label is used to implement a multi-level security paradigm, the security label information is used to provide data/user classification levels. In this scenario, the authentication server assigns a security label that includes a minimum and maximum security level. The assigned minimum security level is the minimum security level of a packet that this entity (user, host or the like) will accept, and so defines the entities allowed to communicate with the given network device. Similarly, the assigned maximum security level is the maximum security level of a packet that this entity (user, host or the like) can accept, and so defines the entities with which the given network device allowed to communicate (and the information to which that network device is given access). It will be appreciated that, in this scenario, a packet need only be labeled with a single security level in order for that label to be properly processed.

In the case in which a bitmap security label is used to implement a multilateral security paradigm, the security label information is used to provide data access groups or user groups, in situations in which levels of classification are inappropriate (e.g., corporate environments, which are better delineated by function (e.g., marketing, engineering and the like)). In this scenario, the authentication server assigns a security bitmap that includes, for example, a bitmap with one or more bits set, indicating membership in one or more security groups (e.g., data access or user groups). As before, data packets need only be labeled with a single security level. However, in using a bitmap security label, multiple bits can be set in the bitmap, allowing a user, host or network entity to enjoy membership in multiple security groups.

Regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of network devices 410(1)-(N)). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 5:
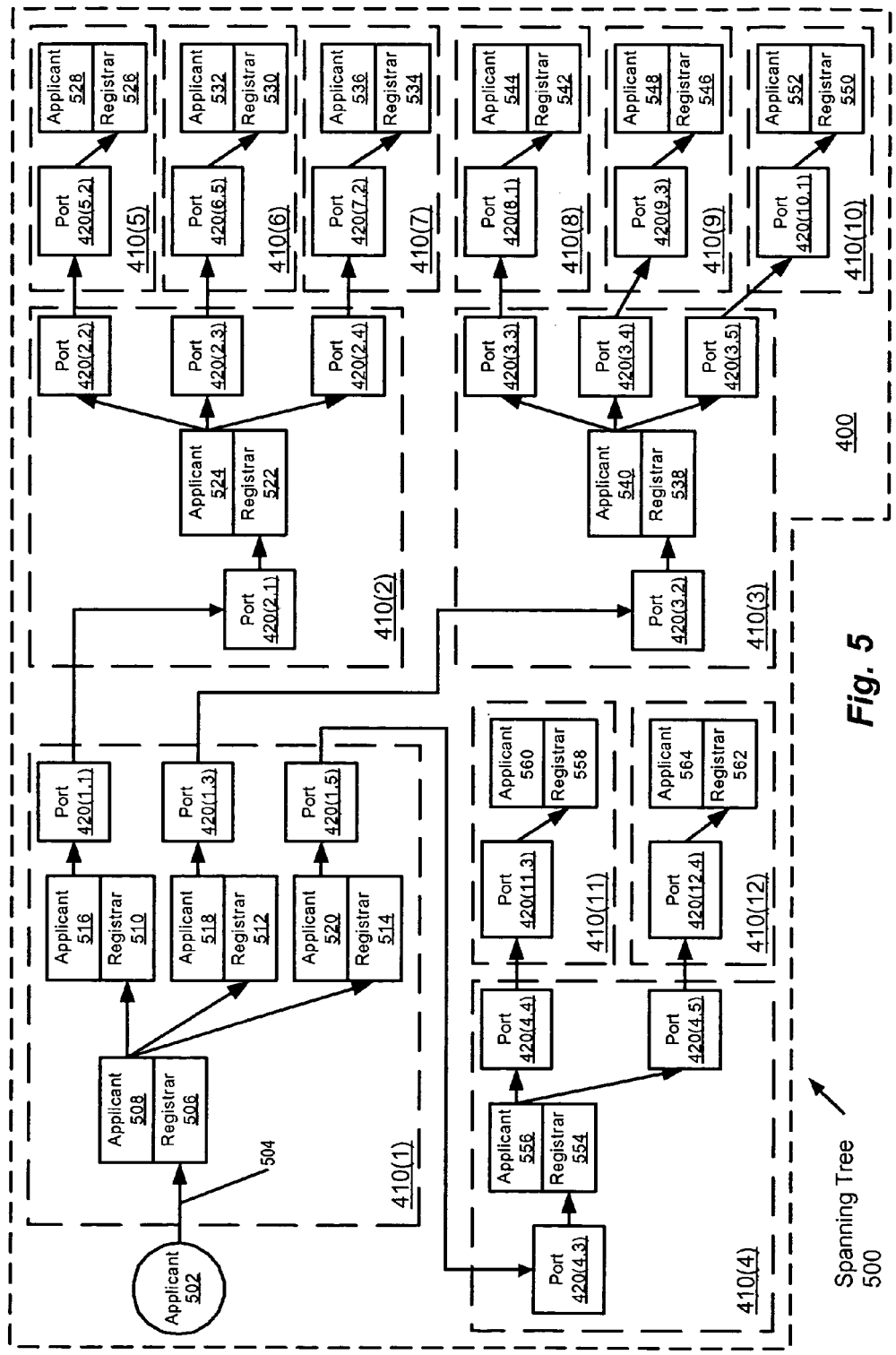
FIG. 5 is a block diagram illustrating a spanning tree for the network depicted in FIG. 4 according to embodiments of the present invention.

FIG. 5 is a block diagram illustrating a spanning tree corresponding to the couplings between network devices 410(1)-(12) of FIG. 4 (i.e., network 400). As depicted in FIG. 5, a spanning tree 500 (e.g., an IEEE 802.1D spanning tree) is used to represent the communications paths within network 400. Beginning with the modules within network device 410(1), an applicant 502 issues a join request 504 to a registrar 506 (in the manner of join 330 of FIG. 3). Registrar 506 is associated with an applicant 508. In turn, applicant 508 makes application to a number of registrars (registrars 510, 512, and 514). Registrar 510 is associated with an applicant 516, which accesses network 400 via port 420(1,1). Registrar 512, similarly, is associated with an applicant 518, which accesses network 400 via port 420(1,3). In a similar fashion, registrar 514 is associated with an applicant 520, which accesses network 400 via port 420(1,5).

In turn, applicants 516, 518 and 520 make application to a number of registrars. Via a connection between port 420(1,1) and port 420(2,1), applicant 516 makes application to a registrar 522, which is associated with an applicant 524. Applicant 524 makes application to a registrar 526 (which is associated with an applicant 528) via ports 420(2,2) and 420(5,2). Applicant 524 also makes application to a registrar 530 (which is associated with an applicant 532) via ports 420(2,3) and 420(6,5). Lastly, applicant 524 makes application to a registrar 534 (which is associated with an applicant 536) via ports 420(2,4) and 420(7,2).

In a similar fashion, applicant 518 makes application to a registrar 538 via ports 420(1,3) and 420(3,2). Registrar 538 is associated with an applicant 540. Applicant 540 makes application to a registrar 542 (which is associated with an applicant 544) via ports 420(3,3), and 420(8,1). Applicant 540 also makes application to a registrar 546 (which is associated with an applicant 548) via ports 420(3,4) and 420(9,3). Lastly, applicant 540 makes application to a registrar 550 (which is associated with an applicant 552) via ports 420(3,5) and 420(10,1).

The last of the applicants coupled to one of the ports of network device 410(1), applicant 520 makes application to a registrar 554 via ports 420(1,5) and 420(4,3). Associated with registrar 554 is an applicant 556. Applicant 556 makes application to a registrar 558 (which is associated with an applicant 560) via ports 420(4,4) and 420(11,3). Applicant 556 also makes application to a registrar 562 (which is associated with an applicant 564) via ports 420(4,5) and 420(12,4).

It will therefore be appreciate that the applicants within spanning tree 500 are analogous to the applicants within GIP context 300. Thus, an applicant issues a join request (e.g., join request 504 (analogous to join request 330)) in order to promulgate its security level throughout spanning tree 500. This enables the proper security levels to be set throughout the network, based on the security level of the network devices connected to a given port. Security measures can thus be pushed from the egress interface to the network devices in the core network, providing a number of advantages. One such advantage is protection of higher-security network entities from directed denial-of-service attacks by network entities having lower classifications. Resistance to piracy is improved as a result of traceroutes, sweeps and the like being dropped earlier. These advantages stem in part from the fact that security can be enforced at each network hop. Moreover, such a solution provides protection similar to the polyinstantiation available in trusted operating systems.

In such a scenario, each edge port has security information from a policy server that is provided via the authentication of the user. For example, either a multi-level security model (e.g., a minimum, maximum security level pair) or a multi-lateral security model (e.g., a bitmap containing one or more bits set) can be implemented. Each core port thus receives security information via appropriate protocols. In the case of a multi-level security model, information is maintained as to the lowest minimum and highest maximum security level of networks/hosts that are reachable via the port. In the case of a multilateral security model, a bitmap is maintained that contains a superset of all bits set in the networks/hosts reachable via the port. It will be appreciated that ports can also have static configured multilevel ranges and/or multilateral bitmaps.

Figure 6:
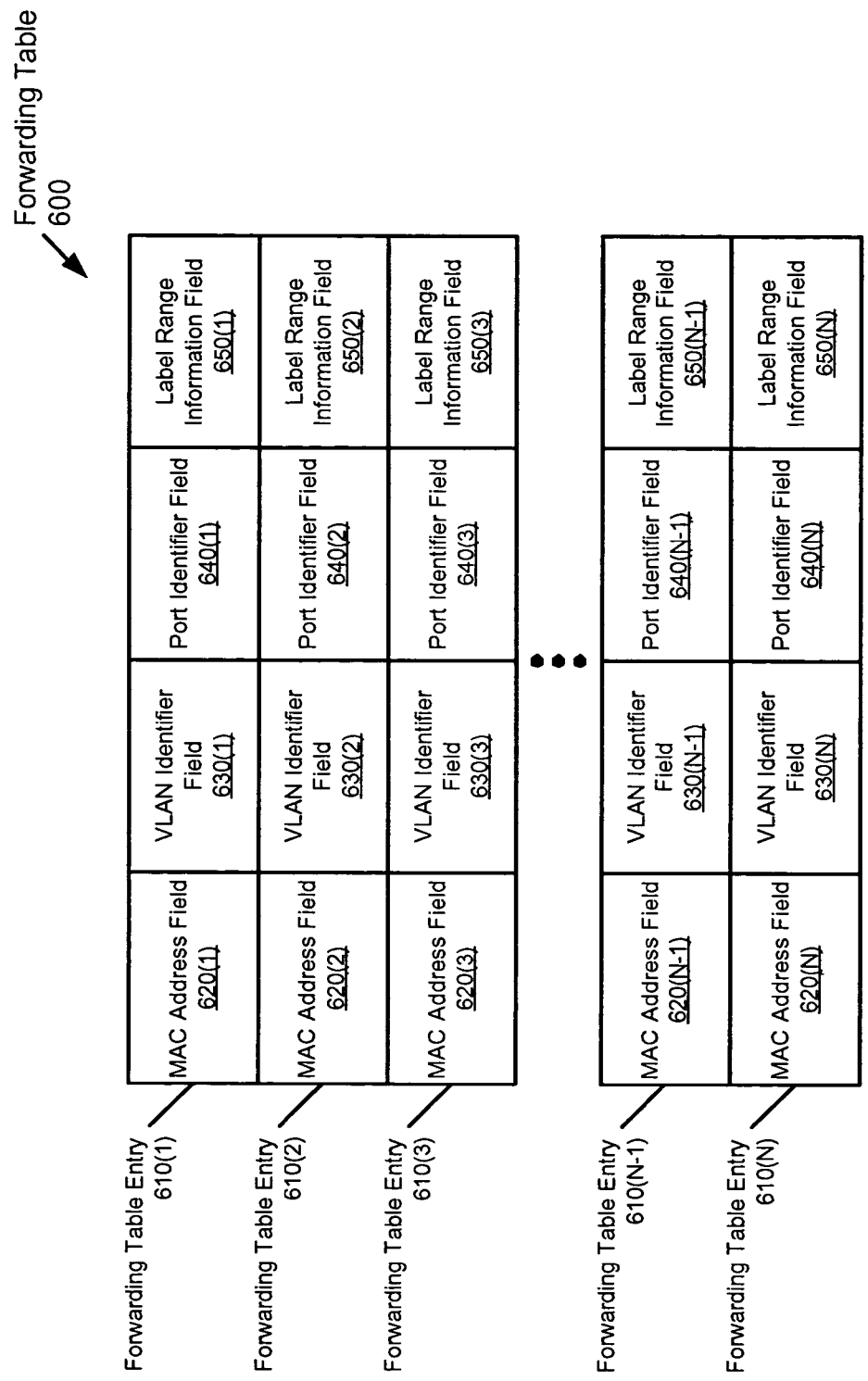
FIG. 6 is a block diagram illustrating an example of a forwarding table according to embodiments of the present invention.

FIG. 6 is a block diagram illustrating an example of a forwarding table 600 according to embodiments of the present invention. Forwarding table 600 includes a number of forwarding table entries (depicted as forwarding table entries 610(1)-(N)). Each of forwarding table entries 610(1)-(N)

includes a media access control (MAC) address field (depicted as MAC address fields 620(1)-(N)), a virtual local area network (VLAN) identifier field (depicted as VLAN identifier fields 630(1)-(N)), a port identifier field (depicted as port identifier field 640(1)-(N)), and a security label range information field (or, more simply, a label range field; depicted as security label range information fields 650(1)-(N)).

The mappings between the various fields contained in forwarding table 600, as discussed previously, relate port, VLAN, address and label (or label range) information. Thus, a MAC address and VLAN identifier can be related to a physical port (as indicated by the port's port identifier) and the port's security level(s) (as indicated by the port's security label (range)). The port is assigned a security level (or range of security levels) by the process of applicants joining the GIP context to which the port's associated registrar belongs, which is stored in the respective label range information field for the port's entry in the forwarding table. The packet's MAC address, the packet's VLAN identifier and/or the port identifier of the port on which the packet was received can then be used to determine the applicable security level(s). For example, a packet's security level can be identified on the basis of the port on which the packet was received and the packet's VLAN. This allows a network device within the network to decide how to handle a packet, based on the packet's security label. Moreover, such a technique can be implemented using a separate table, indexed by port, allowing a centralized approach, such that the forwarding table need not contain the range. In such a case, the range is stored in another table, which is indexed by the port identifier.

It will be appreciated that a likely alternative to storing such information in a forwarding table is to store the label range in the port itself (e.g., in a hardware register, memory or the like). In that case, a given packet is checked at the packet's egress port. By doing so, each port (e.g., egress port) can perform filtering of packets at intermediary network devices between a given packet's source and intended destination, in the manner depicted in FIG. 5. In using a protocol according to the present invention (e.g., GSRP), as noted, protocol packets are accepted by security trunk ports, and are dropped by security access ports. Such a protocol uses a single GIP context per spanning tree, as described previously in connection with FIGS. 3, 4 and 5. In one embodiment, there are two different attribute types: Minimum Security Label (MaxSL; indicating a maximum security level) and Maximum Security Label (MinSL; indicating a minimum security level). The maximum security level of the port is that of the highest security level received by the GID registrar for the port, and the minimum security level of the port is that of the lowest security level received by the GID registrar for the port. This can be achieved in a number of ways. For example, the security bitmap of the port can be the logical OR of all of the security bitmaps received on the port, which is typically the case when a multi-lateral security paradigm is implemented. Alternatively, information as to a maximum and minimum security level can be maintained (e.g., using the MaxSL and MinSL attributes noted above), which is typically the case when a multi-level security paradigm is implemented. In order to simplify the process and minimize impact on network resources, a join request should be sent from a given applicant to a given port's GID registrar only if the minimum security level of the applicant is lower than the minimum for that subnetwork or if the maximum security level of the applicant is higher than the maximum for that subnetwork.

Figure 7:
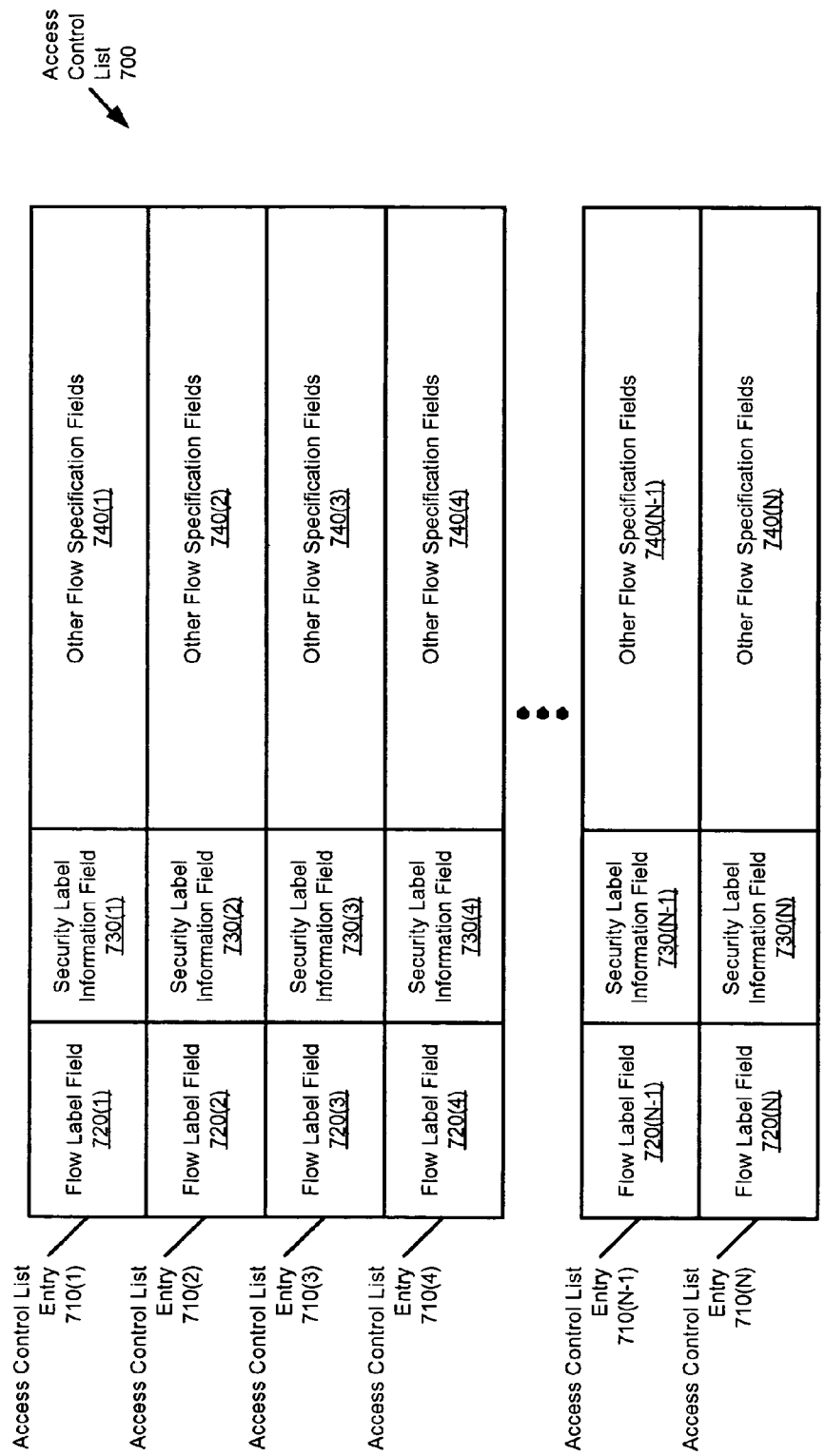
FIG. 7 is a block diagram illustrating an example of an access control list (ACL) according to embodiments of the present invention.

FIG. 7 is a block diagram illustrating an example of an access control list (ACL) 700 according to the present invention. Access control list 700 includes a number of entries (referred to as access control list entries or ACEs), which are depicted in FIG. 7 as access control list entries 710(1)-(N). Each of access control list entries 710(1)-(N) includes a flow label field (depicted as flow label fields 720(1)-(N)), a security label information field (depicted as security label information fields 730(1)-(N)), and other flow specification fields (depicted as other flow specification fields 740(1)-(N)). An ACL such as that shown as ACL 700 can be implemented using a content-addressable memory (CAM), and more specifically, a ternary cam (TCAM), providing fast and efficient look-up of security information, based on information stored in security label information fields 730(1)-(N).

In a network device configured according to the present invention, an ACL such as ACL 700 is used to identify the processing to be performed on a given packet, based in part on the packet's security level and the security level (or security level range) of the port on which the packet was received. The security level of the port is reflected in the security label stored in the applicable one of access control list entries 710(1)-(N), and, more specifically, in the corresponding one of security label information fields 730(1)-(N). The port to which the ACE should apply is identified by the process by which the applicable ACE(s) is (are) identified.

It will be appreciated that flow label fields 740(1)-(N) can be employed to identify the given one of access control list entries 710(1)-(N) as an ACE that supports security labeling according to the present invention (e.g., in the case where not all ACEs support such determinations). Alternatively, a flow label field can be used (at least in part) to help identify the port(s), and so, the traffic to which the ACE should apply.

Figure 8:
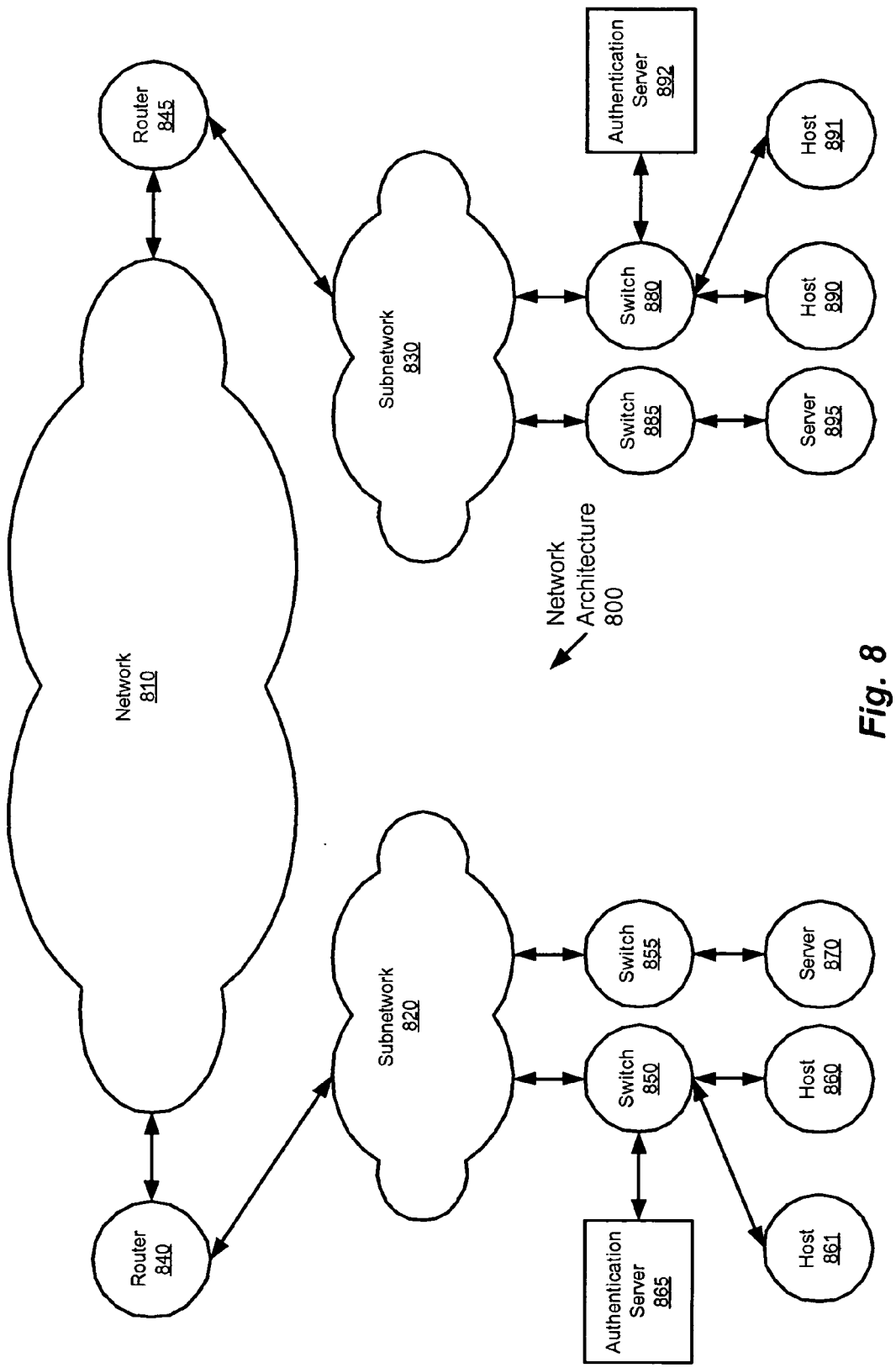
FIG. 8 is a diagram illustrating another example of a network architecture in which the present invention can be practiced.

FIG. 8 is a block diagram illustrating an example of a network architecture 800 in which the present invention can be practiced. In the example presented as network architecture 800, network 810 is an internet protocol (IP) network (i.e., for example, a network in which devices forward packets using layer 3 addresses). Network 810 couples subnetworks 820 and 830, which access network 810 via routers 840 and 845, respectively. Subnetworks 820 and 830 are IP subnetworks (i.e., for example, a network in which devices forward packets using layer 2 addresses). Coupled to subnetwork 820 are switches 850 and 855. Switch 850 couples hosts 860 and 861 to subnetwork 820, and also provides for access to an authentication server 865, in order for users of hosts 860 and 861 to be authenticated. Authentication server 865 authenticates of users logging into host 860 (and so, more generally, network architecture 800). In a similar fashion, switch 855 provides a server 870 access to subnetwork 820 (as well as to the rest of network architecture 800). In a similar fashion, switches 880 and 885 provide access to subnetwork 830. Hosts 890 and 891 access subnetwork 830 via switch 880; users of hosts 890 and 891 are authenticated by an authentication server 892. As before, authentication server 892 serves to authenticate users logging into host 890. Also as before, switch 885 also provides a server 895 access to subnetwork 830.

The operation of the present invention in a network such as network architecture 800 can support a variety of arrangements. For example, each of hosts 860, 861, 890 and 891, as well as servers 870 and 895, can be designed to support a single security level (for which a range of 1 (lowest security level) to 7 (highest security level) can be used). In such a case, host 860, host 861 and server 870 might each have a security level of 3. Given this arrangement, hosts 860 and 861 would be able to access server 870 (i.e., their packets would not be dropped by either of switches 850 or 855). Routers 840 and 845, and switches 850, 855, 880 and 885 are thus configured according to the present invention to either block or allow the passage of packets, depending on the packets' security level.

In a similar fashion, host 890, host 891, and server 895 might each have a security level of 5. Given this arrangement, hosts 890 and 891 would be able to access server 895 (i.e., their packets would not be dropped by either of switches 880 or 885). Moreover, hosts 890 and 891 would be able to access server 870 (given their respective security levels), as the packets sourced by hosts 890 and 891 would not be dropped by either of router 840 or 845 (or any intermediary routers), or switches 880 or 855. However, host 860 and host 861 would not be able to access server 895. Packets sourced by host 860 would be blocked by switch 885 (or router 845, depending upon the implementation), which, as noted, would permit packets only at or above the lowest security level permitted by switch 885 (router 845).

Alternatively, security label ranges can be implemented in network architecture 800. In that case, using the same security level scheme (1-7) and security level settings for the clients (host 860 having a security level of 2, host 861 having a security level of 3, host 890 having a security level of 4 and host 891 having a security level of 5), the following example can be posited. In this example, server 870 might have a security level range of 1-3, while server 895 might have a security level range of 3-5. In that case, router 840 would only allow packets into subnetwork 820 having a security level of 1-3, while router 845 would only allow packets into subnetwork 830 having a security level of 3-5.

As before, hosts 860 and 861 are able to access server 870, as the security label of their packets will not cause their packets to be blocked by switch 855. Similarly, hosts 890 and 891 are able to access server 895, as the security label of their packets will not cause their packets to be blocked by switch 885. Moreover, packets sourced by host 861, having a security label reflecting a security level of 3, is able to access server 895, because those packets will not be dropped by router 845. However, packets sourced by host 860, having a security label reflecting a security level of 2, is not able to access server 895, because those packets will be dropped by router 845 for having a security level insufficient for the given subnetwork (i.e., subnetwork 830).

An Example Process for Security Labeling and Use Thereof

Figure 9:
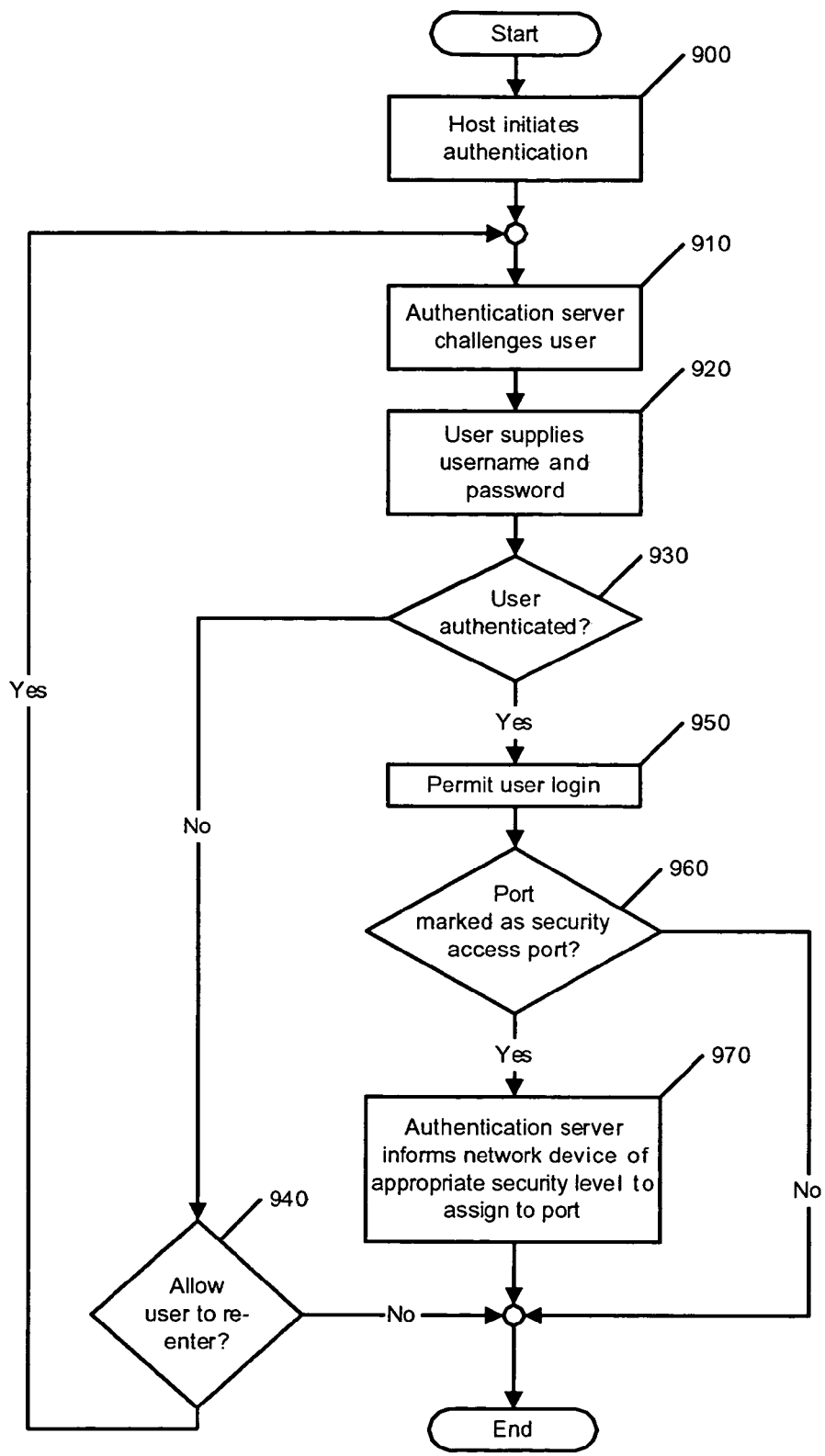
FIG. 9 is a flow diagram illustrating an example of user authentication in a network according to embodiments of the present invention.

FIG. 9 is a flow diagram illustrating an example of an authentication operation in which a user logs into the network on a host (e.g., host 110 or 111). The process begins with the host initiating the authentication process (step 900). Next, a challenge is issued from the appropriate authentication server, to challenge the user for their user name and password (step 910). In response to this challenge, the user supplies their username and password (step 920). A determination is then made as to whether the authentication server can authenticate the user (step 930). If the user cannot be authenticated, a determination is made as to whether not to allow the user to re-enter their username and password (step 940). If the re-entry of this information is acceptable, process loops back to the point at which the authentication server challenges the user (step 910). Otherwise (e.g., if re-entry has been allowed a maximum a number of times, or re-entry is not permitted), the process ends.

Alternatively, if the user is authenticated (step 930), the user is permitted to log in, which is accomplished by the authentication server forwarding access acceptance to the switch (step 950). Typically, notification is then sent to the user by sending a notification from the switch to the host, primarily for the purpose of indicating the acceptance to the user. A determination is then made as to whether the port to be used by that user (e.g., the port to which the host is attached) is designated as a security access port (step 960). If the port is not designated as a security access port, the process of user login is complete. However, if the port is designated as a security access port, the authentication server informs the network device (e.g., the switch or router to which the host is coupled) of the appropriate security level to assign to port. The network device then assigns that security level as appropriate, given the other users accessing the port and existing security information, as described in connection with FIGS. 4 and 5, and elsewhere herein. This completes the process of user login.

As noted, FIG. 9 depicts a flow diagram illustrating a process according to an embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer-readable storage media. The computer-readables storage media may be permanently, removably or remotely coupled to the computer system. The computer-readable storage media may non-exclusively include, for example, any number of the following: magnetic storage media including disk and tape storage media. optical storage media such as compact disk media (e.g., CD-ROM, CD-R, etc.) and digital video disk storage media; nonvolatile memory storage memory including semiconductor-based memory units such as FLASH memory, EEPROM, EPROM, ROM or application specific integrated circuits; and volatile storage media including registers, buffers or caches, main memory, RAM, and the like. In a UNIX-based embodiment, the software modules may be embodied in a file which may be a device, a terminal, a local or remote file, a socket, or other expedient of state change. Other new and various types of computer-readable storage media may be used to store the software modules discussed herein.

Figure 10:
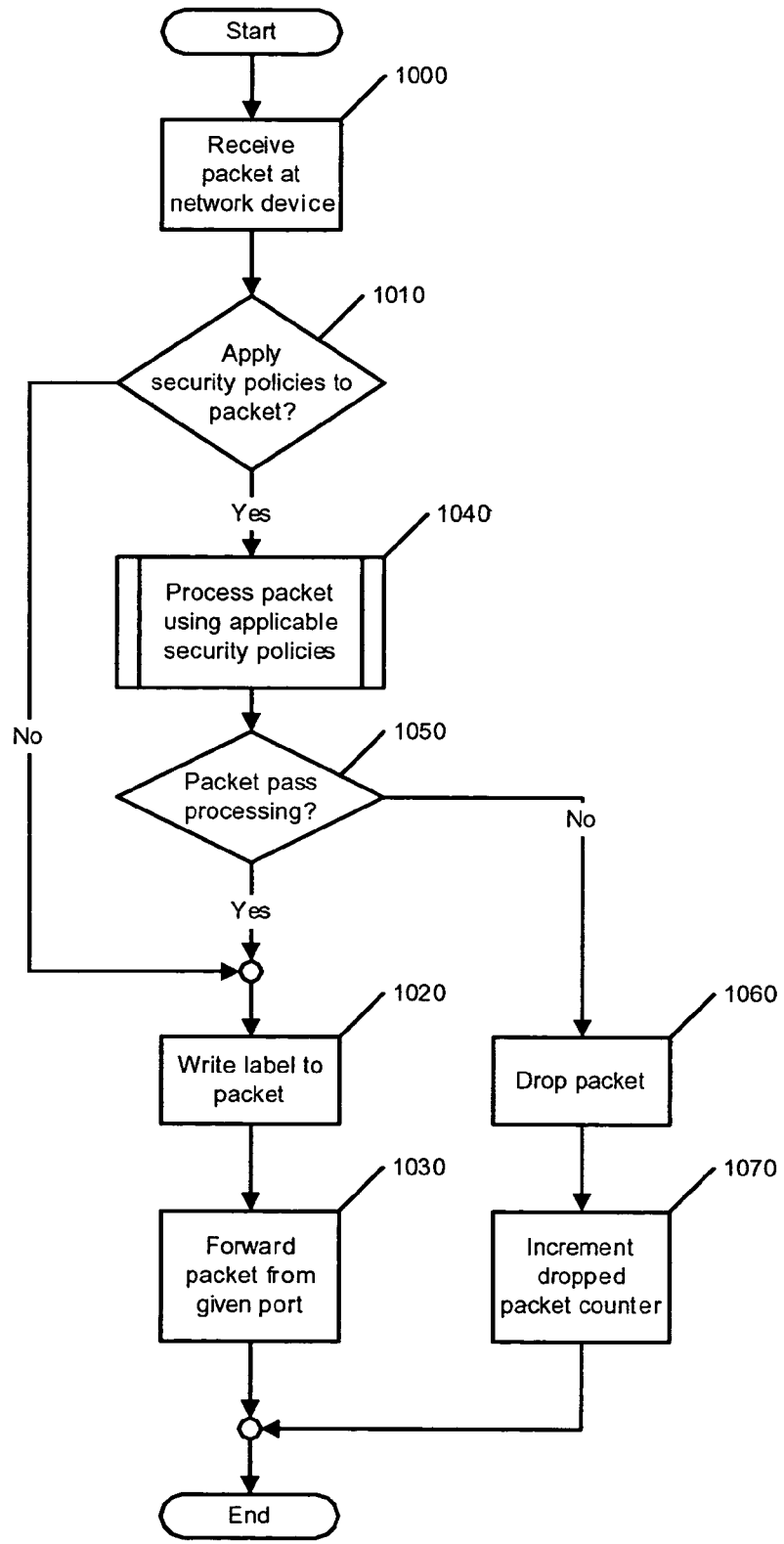
FIG. 10 is a flow diagram illustrating an example of packet labeling in a network according to embodiments of the present invention.

FIG. 10 is a flow diagram illustrating an example of packet labeling in a network according to embodiments of the present invention. The process of packet labeling at a given network device begins with the reception of that packet at the network device (step 1000). Having received the packet, the network device then makes a determination as to whether to apply security policies to the packet thus received (step 1010). If a determination is made indicating that security policies are not to be applied to the packet (e.g., in the case of an unlabeled packet being received at an ingress router), the appropriate label is simply written to the packet (step 1020) and the packet forwarded to the appropriate port (step 1030). However, if security policies are to be applied to the packet (step 1010), the packet is processed using the applicable policies (step 1040). The application of such security policies is discussed in greater detail in connection with FIG. 11.

Next, a determination is made as to whether the packet has successfully passed the security policy processing performed (step 1050). If the packet fails this processing, the packet is dropped (step 1060) and a dropped packet counter incremented (step 1070). However, if the packet successfully passes this security processing, the appropriate label is written to the packet (step 1020) and the packet forwarded to the appropriate port (step 1030). As noted elsewhere, it is expected that security labeled packets on a security access port and unlabeled packets received on a security trunk port are dropped, as they are not expected to occur at such points.

Figure 11:
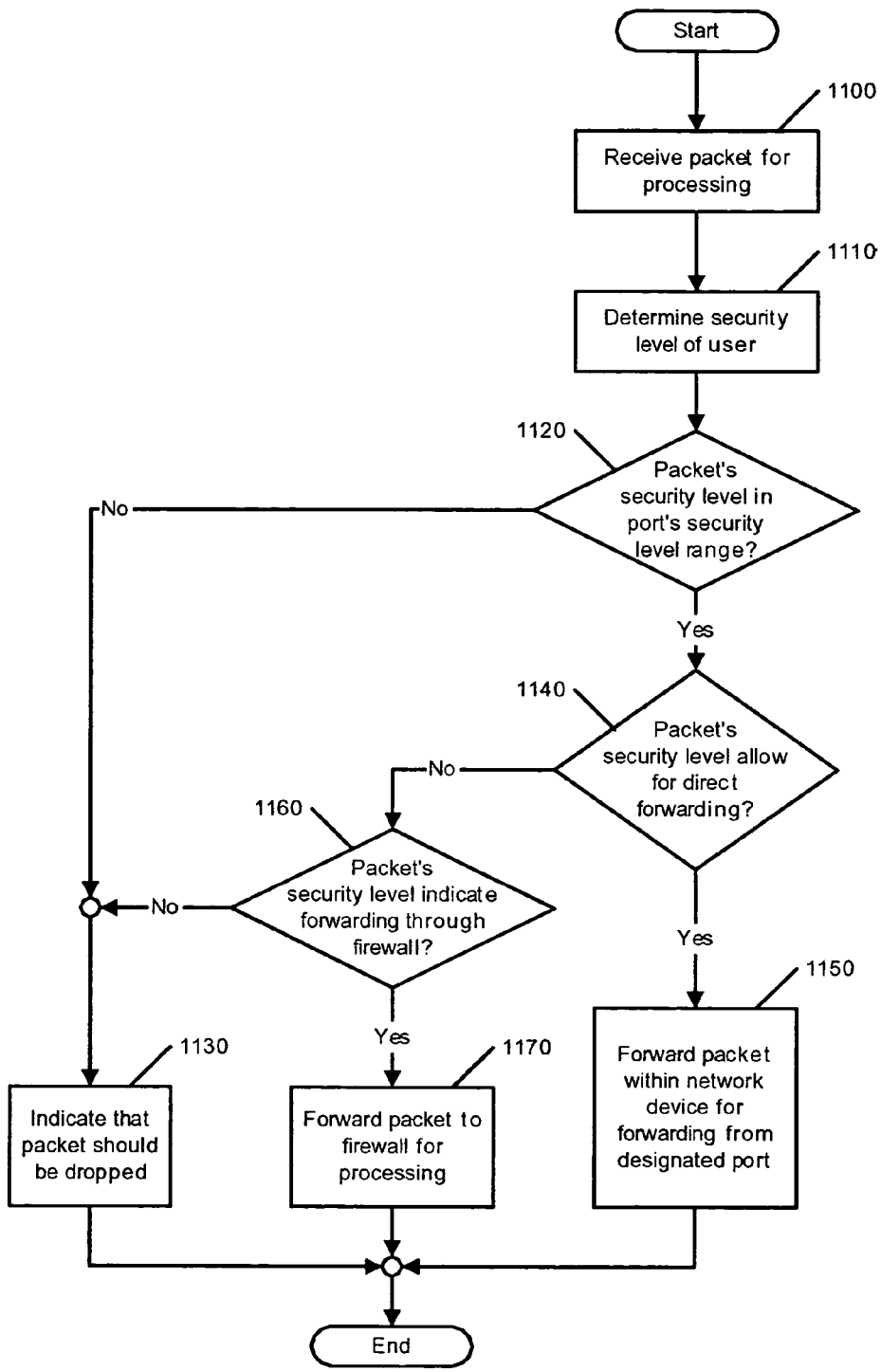
FIG. 11 is a flow diagram illustrating an example of packet processing in a network according to embodiments of the present invention.

FIG. 11 is a flow diagram illustrating an example of the processing performed on a packet when applying security policies in a manner according to embodiments of the present invention (e.g., as inferred with regard to step 1040 of FIG. 10). The process begins with the packet's receipt by a packet processing unit that implements the present invention (step 1100). A determination is made as to the security level of the user responsible for generating the packet (step 1110). Next, a determination is made as to whether the security level of the packet (and so the user) is within the security level range of the port on which the packet was received (step 1120). If the packet's security level is not within the port's security level range, the packet processing unit indicates that the packet has not successfully passed the security policy processing, and so the packet should be dropped (step 1130).

However, if the packet's security level is within the port's security level range, a determination is made as to whether the packet's security level allows for the direct forwarding of the packet within the network device to its designated outbound port (step 1140). If the packet's security level indicates that the packet should be directly forwarded, the packet is forwarded within the network device to its designated outbound port for forwarding to the next network device on its intended path (step 1150). However, if the packet's security level does not allow for direct forwarding a determination is made as to whether the packet's security level indicates that the packet can be forwarded instead through a firewall (step 1160). It will be appreciated that, in fact, the diversion of a packet can be made to occur for any number of reasons, and any number of actions taken (or processing performed) upon such diversion. If the packet's security level indicates that forwarding through a firewall is not acceptable, the packet processing unit indicates that the packet should be dropped (step 1130). If the packet's security level indicates that forwarding through a firewall is permitted, the packet processing unit forwards the packet to a firewall for further processing (step 1170).

Figure 12A:
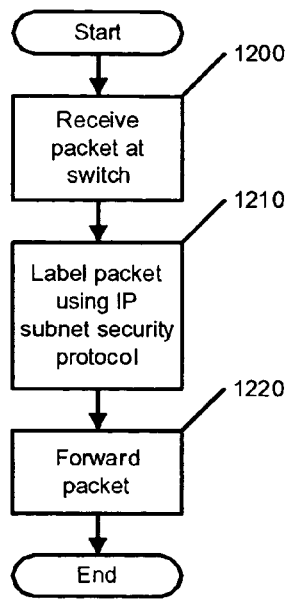
FIG. 12A is a flow diagram illustrating an example of reception, labeling and forwarding of packet at a switch in a network according to embodiments of the present invention.

FIG. 12A is a flow diagram illustrating an example of the reception, labeling and forwarding of the packet at switch in a network according to embodiments of the present invention. The process begins with the receipt of the packet at the switch (step 1200). The packet is then labeled using a layer 2 security protocol (step 1210). Once labeled, the packet is forwarding along its intended path (step 1220). In subnets in which such security labeling is performed, the security trunk ports perform the analysis described previously, allowing subnets to be secured using methods according to the present invention.

Figure 12B:
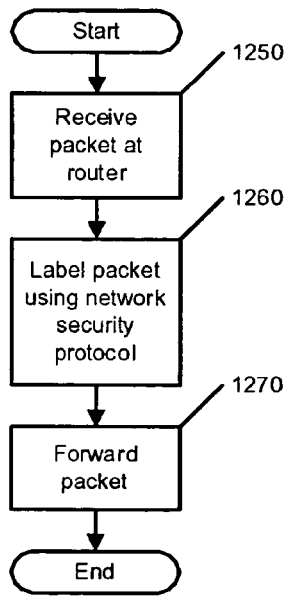
FIG. 12B is a flow diagram illustrating an example of reception, labeling and forwarding of packet at an ingress router in a network according to embodiments of the present invention.

FIG. 12B is a flow diagram illustrating an example of the reception, labeling and forwarding of the packet at an ingress router in a network according to embodiments of the present invention. The progress beings with the receipt of the packet at the router (step 1250). Next, the packet is labeled using a layer three security protocol (step 1260). Once labeled, the packet is forwarded along its intended path (step 1270). Such labeling, as described previously, allows the analysis and control of packets to be performed within a core (e.g., IP) network, providing the benefits described earlier.

Figure 13:
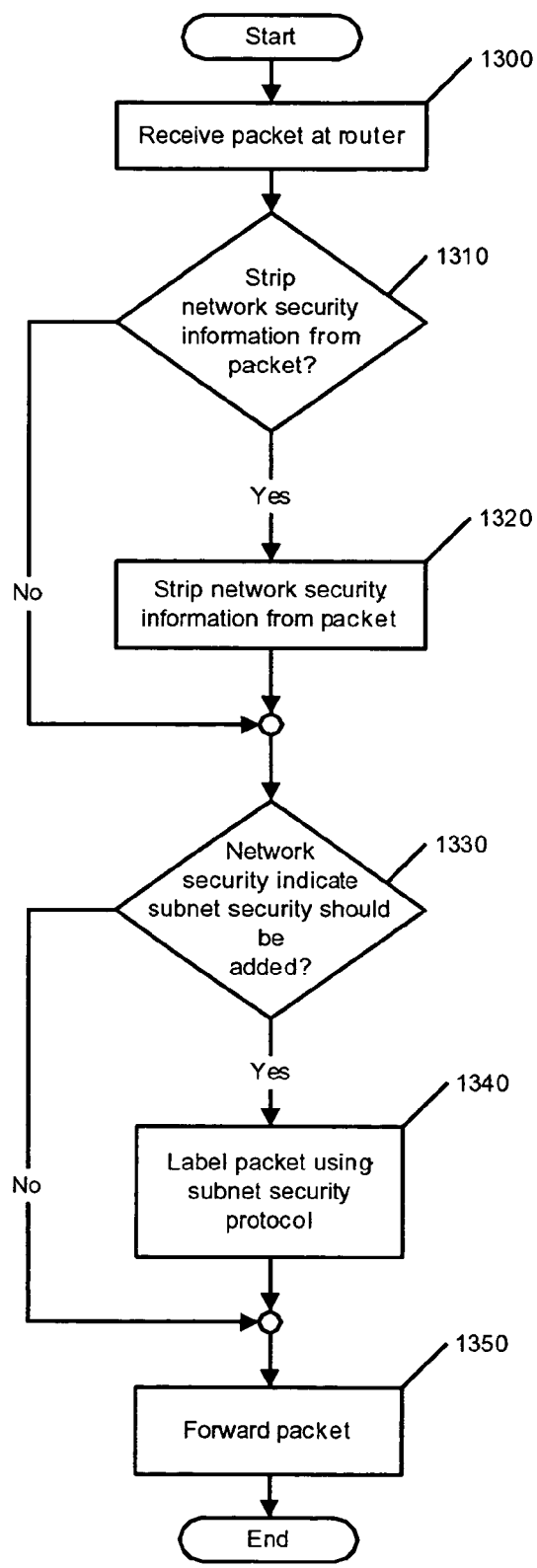
FIG. 13 is a flow diagram illustrating an example of reception, labeling and forwarding of packet at an egress router in a network according to embodiments of the present invention.

FIG. 13 is a flow diagram illustrating an example of the reception, labeling and forwarding of the packet at an egress router in a network according to embodiments of the present invention. The process begins with the receipt of a packet at the egress router (step 1300). A determination is then made as to whether network security information exists with the packet, and whether that information needs to be stripped from the packet (step 1310). If the packet includes network 3 security information, that security information is stripped from the packet (step 1320).

Otherwise (or after the network information has been stripped from the packet), a determination is made as to whether the network security information indicates that subnet security information should be added (step 1330). If the network security information indicates that subnet security information should be added, the router labels the packet using the appropriate subnet security protocol (adding security information to the packet per that protocol) (step 1340). Otherwise (or after the addition of subnet security information), the packet is forwarded along its intended path (into the appropriate subnet) (step 1350).

Figure 14:
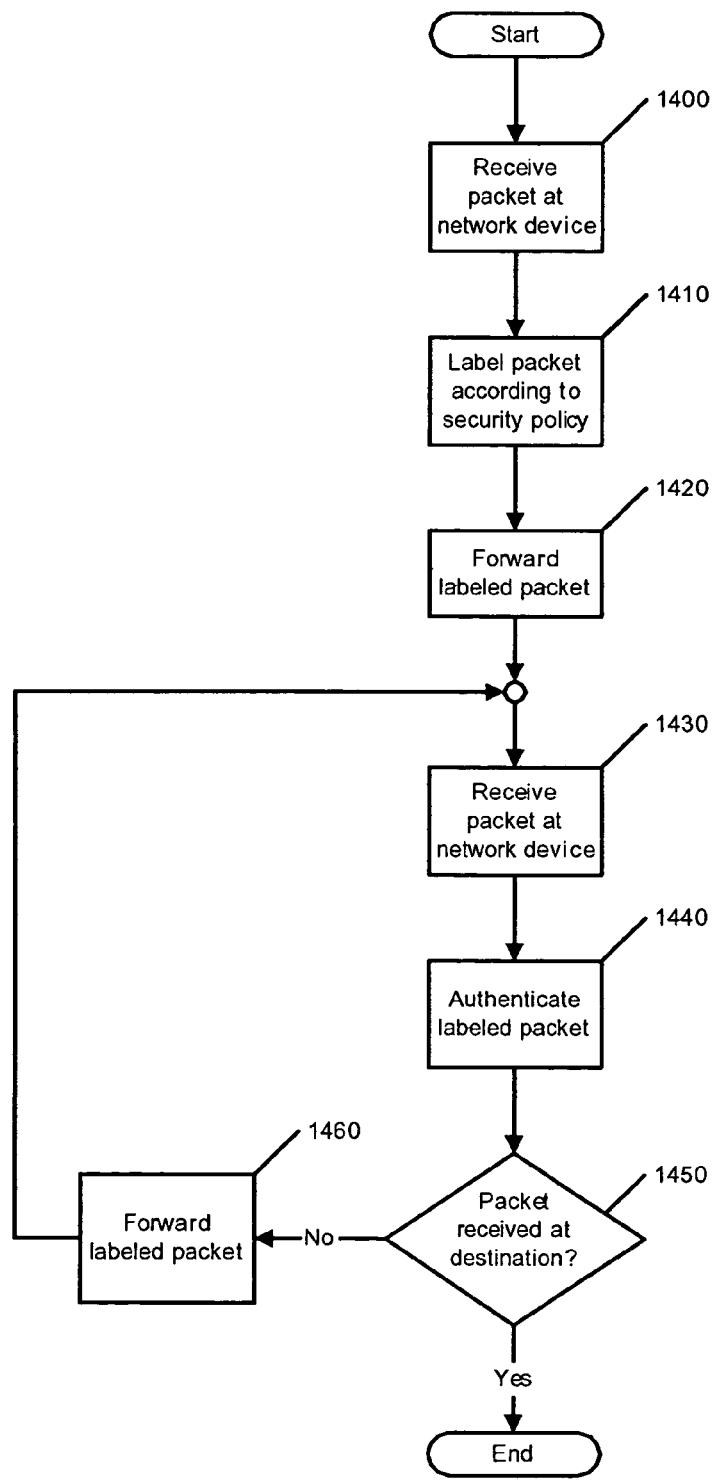
FIG. 14 is a flow diagram illustrating an example of packet authentication in a network according to embodiments of the present invention.

FIG. 14 is a flow diagram illustrating an example of packet authentication in a network according to embodiments of the present invention. The process begins with the receipt of a packet at a network device at which the packet is first received (e.g., an ingress router) (step 1400). Next, the packet is labeled according to the security policy in place (step 1410). The labeled packet is then forwarding along its intended path (step 1420). At one or more of the network devices along the labeled packet's intended path, the packet is authenticated in the following manner. First, the packet is received at a network device that will authenticate the packet (step 1430). Next, that network device authenticates the labeled packet (step 1440). A determination is then made as to whether the packet has been received at that packet's destination (step 1450). If the present network device is the packet's intended destination, the authentication process is complete. However, if the present network device is not the intended destination, the packet is forwarded along its intended path (step 1460).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method comprising:
  comparing first security level information and second security level information,
    wherein
      said first security level information is stored in a security label of a packet received at a network node of a network,
      said first security level information represents a first security level,
      said first security level is a security level of a source of said packet,
      said second security level information is stored at said network node,
      said second security level information is received from another network node of said network as a result of said second security level information being registered in a context,
      said second security level information is configured to be updated by virtue of said second security level information being configured to be combined with third security level information,
      said second security level information represents a second security level,
      said second security level is a security level of a destination of said packet,
      said network comprises a plurality of network nodes,
      said network nodes comprise said network node and said another network node, and
      said network nodes are configured to convey packets to one another via others of said network nodes; and
  indicating processing to be performed on said packet based on said comparing,
    wherein
      said processing comprises
        determining whether to forward said packet from said network node to one of said network nodes.

2. The method of claim 1, wherein
  said another network node is coupled to said destination of said packet.

3. The method of claim 1, wherein
  said first security level and said second security level implement one of a multi-level security paradigm and a multi-lateral security paradigm.

4. The method of claim 1, wherein
  said security label is one of an enumerated security label and a bitmap security label.

5. The method of claim 1, wherein
  said second security level is a security level of a port of said network node.

6. The method of claim 5, further comprising:
  setting said security level of said port.

7. The method of claim 6, wherein said setting said security level of said port comprises:
  storing said second security level in a security label information field of an access control list entry.

8. The method of claim 6, wherein said setting said security level of said port comprises:
  storing said second security level in a label range information field of a forwarding table entry.

9. The method of claim 1, wherein said processing comprises:
  dropping said packet, if said comparing indicates that said first security level is less than said second security level.

10. The method of claim 1, wherein
  said processing comprises at least one of dropping said packet, redirecting said packet and rewriting said security label.

11. The method of claim 1, wherein
  said second security level information represents a plurality of security levels, and said security levels comprise said second security level.

12. The method of claim 11, wherein
  said security levels are a range of security levels.

13. The method of claim 12, wherein said processing comprises:
  dropping said packet, if said comparing indicates that said first security level is not within said range of security levels.

14. The method of claim 1, further comprising:
  storing said second security level information at said network node.

15. The method of claim 14, wherein said storing comprises:

storing said second security level in a security label information field of an access control list entry.

16. The method of claim 14, wherein said storing comprises:
storing said second security level in a label range information field of a forwarding table entry.

17. The method of claim 14, wherein
said storing comprises
receiving said second security level information from said another network node, and
said receiving occurs as a result of said second security level being registered in said context.

18. The method of claim 17, wherein said second security level information is configured to be combined with said third security level information by virtue of said second security level information being configured to be
logically OR'd with said third security level information.

19. The method of claim 17, wherein
said context is a generic attribute registration protocol information propagation context, and
said registering said second security level is accomplished by said first network node issuing a join request.

20. The method of claim 14, wherein said storing comprises:
storing said second security level in a label range information field of forwarding table.

21. The method of claim 14, wherein said storing comprises:
storing said second security level in a port of said network node.

22. The method of claim 21, wherein said port is an egress port.

23. The method of claim 1, further comprising:
determining said first security level.

24. The method of claim 23, wherein said determining comprises:
determining if an ingress port is marked as an access port; and
setting a security level of said ingress port to said first security level, if said ingress port is marked as an access port.

25. The method of claim 24, further comprising:
setting said first security level information to said security level of said ingress port.

26. The method of claim 23, further comprising:
authenticating a user having said first security level, wherein
said determining is performed only if said user is authenticated.

27. The method of claim 1, further comprising:
performing said processing on said packet based on said comparing.

28. The method of claim 27, wherein said performing said processing comprises:
performing said forwarding of said packet, if said indicating indicates that said packet is allowed to be forwarded; and
dropping said packet, otherwise.

29. The method of claim 27, wherein said performing said processing comprises:
forwarding said packet to a firewall, if said indicating indicates that said packet should be forwarded to said firewall.

30. The method of claim 1, further comprising:
stripping network security information from said packet; and
adding subnetwork security information to said packet.

31. The method of claim 30, wherein
said network security information comprises said first security level information.

32. The method of claim 30, wherein
said subnetwork security information comprises said first security level information.

33. A computer system comprising:
a processor;
a tangible, non-transitory computer-readable storage medium coupled to said computer, and
computer instructions, encoded in said computer-readable storage medium, configured to cause said processor to:
compare first security level information and second security level information, wherein
said first security level information is stored in a security label of a packet received at a network node of a network,
said first security level information represents a first security level,
said first security level is a security level of a source of said packet,
said second security level information is stored at said network node,
said second security level information is received from another network node of said network as a result of said second security level information being registered in a context,
said second security level information is configured to be updated by virtue of said second security level information being configured to be combined with third security level information,
said second security level information represents a second security level,
said second security level is a security level of a destination of said packet,
said network comprises a plurality of network nodes,
said network nodes comprise said network node and said another network node, and
said network nodes are configured to convey packets to one another via others of said network nodes; and
indicate processing to be performed on said packet based on said comparing, wherein
said processing comprises
determining whether to forward said packet from said network node to one of said network nodes.

34. The computer system of claim 33, wherein said another network node is coupled to said destination of said packet.

35. The computer system of claim 33, wherein said computer instructions are further configured to cause said processor to:
set said security level of a port, wherein
said second security level is a security level of said port of said network node.

36. The computer system of claim 35, wherein said computer instructions configured to cause said processor to set said security level of said port is further configured to cause said processor to:
store said second security level in a security label information field of an access control list entry.

37. The computer system of claim 35, wherein said computer instructions configured to cause said processor to set said security level of said port is further configured to cause said processor to:
store said second security level in a label range information field of a forwarding table entry.

38. The computer system of claim 33, wherein said computer instructions are further configured to cause said processor to:
 store said second security level information at said network node.

39. The computer system of claim 38, wherein said computer instructions configured to cause said processor to store is further configured to cause said processor to:
 store said second security level in a security label information field of an access control list entry.

40. The computer system of claim 38, wherein said computer instructions configured to cause said processor to store is further configured to cause said processor to:
 store said second security level in a label range information field of a forwarding table entry.

41. The computer system of claim 38, wherein said computer instructions configured to cause said processor to store is further configured to cause said processor to:
 receive said second security level information from said another network node by virtue of being configure to cause said processor to register said second security level in said context.

42. The computer system of claim 41, wherein said computer instructions configured to cause said processor to register are further configured to cause said processor to:
 logically OR said third security level information with said second security level information.

43. The computer system of claim 42, wherein
 said context is a generic attribute registration protocol information propagation context, and
 said computer instructions configured to cause said processor to register said second security level is configured to cause said processor to cause said first network node to issue a join request.

44. The computer system of claim 33, wherein said computer instructions are further configured to cause said processor to:
 determine said first security level.

45. The computer system of claim 44, wherein said computer instructions are further configured to cause said processor to:
 authenticate a user having said first security level, wherein
  said computer instructions configured to cause said processor to determine said first security level causes said processor to determine said first security level only if said user is authenticated.

46. The computer system of claim 44, wherein said computer instructions configured to cause said processor to determine said first security level is further configured to cause said processor to:
 determine if an ingress port is marked as an access port; and
 set a security level of said ingress port to said first security level, if said ingress port is marked as an access port.

47. The computer system of claim 46, wherein said computer instructions are further configured to cause said processor to:
 set said first security level information to said security level of said ingress port.

48. The computer system of claim 33, wherein said computer instructions are further configured to cause said processor to:
 perform said processing on said packet based on a result generated by said computer instructions configured to cause said processor to compare.

49. The computer system of claim 48, wherein said computer instructions configured to cause said processor to perform said processing on said packet is further configured to cause said processor to:
 perform said forwarding of said packet, if said computer instructions configured to cause said processor to indicate indicates that said packet is allowed to be forwarded; and
 drop said packet, otherwise.

50. The computer system of claim 33, wherein said computer instructions are further configured to cause said processor to:
 strip network security information from said packet; and
 add subnetwork security information to said packet.

51. A computer program product comprising:
 a non-transitory computer-readable storage medium, wherein
  a plurality of sets of instructions are encoded in said tangible computer-readable medium, and
  said plurality of sets of instructions comprise a first set of instructions, executable on a computer system,
   configured to compare first security level information and second security level information, wherein
   said first security level information is stored in a security label of a packet received at a network node of a network,
   said first security level information represents a first security level,
   said first security level is a security level of a source of said packet,
   said second security level information is stored at said network node,
   said second security level information is received from another network node of said network as a result of said second security level information being registered in a context,
   said second security level information is configured to be updated by virtue of said second security level information being configured to be combined with third security level information,
   said second security level information represents a second security level,
   said second security level is a security level of a destination of said packet,
   said network comprises a plurality of network nodes,
   said network nodes comprise said network node and said another network node, and
   said network nodes are configured to convey packets to one another via others of said network nodes, and
  a second set of instructions, executable on said computer system, configured to indicate processing to be performed on said packet based on said comparing, wherein
   said processing comprises
    determining whether to forward said packet from said network node to one of said network nodes.

52. The computer program product of claim 51, wherein said another network node is coupled to a destination of said packet.

53. The computer program product of claim 51, further comprising:
 a third set of instructions, executable on said computer system, configured to set said security level of a port, wherein
  said second security level is a security level of said port of said network node.

54. The computer program product of claim 53, wherein said third set of instructions comprises:
a first subset of instructions, executable on said computer system, configured to store said second security level in a security label information field of an access control list entry.

55. The computer program product of claim 53, wherein said third set of instructions comprises:
a first subset of instructions, executable on said computer system, configured to store said second security level in a label range information field of a forwarding table entry.

56. The computer program product of claim 51, further comprising:
a third set of instructions, executable on said computer system, configured to store said second security level information at said network node.

57. The computer program product of claim 56, wherein said third set of instructions comprises:
a first subset of instructions, executable on said computer system, configured to store said second security level in a security label information field of an access control list entry.

58. The computer program product of claim 56, wherein said third set of instructions comprises:
a first subset of instructions, executable on said computer system, configured to store said second security level in a label range information field of a forwarding table entry.

59. The computer program product of claim 56, wherein said third set of instructions comprises:
a first subset of instructions, executable on said computer system, configured to receive said second security level from said another network node comprises a first sub-subset of instructions, executable on said computer system, configured to cause said processor to register said second security level in said context.

60. The computer program product of claim 59, wherein said first sub-subset of instructions comprises:
a first sub-sub-subset of instructions, executable on said computer system, configured to logically OR said third security level information with said second security level information.

61. The computer program product of claim 60, wherein said context is a generic attribute registration protocol information propagation context, and
said first sub-subset of instructions is further configured to cause said first network node to issue a join request.

62. The computer program product of claim 51, further comprising:
a third set of instructions, executable on said computer system, configured to determine said first security level.

63. The computer program product of claim 62, further comprising:
a fourth set of instructions, executable on said computer system, configured to authenticate a user having said first security level, wherein
said third set of instructions is further configured to cause said processor to determine said first security level only if said user is authenticated.

64. The computer program product of claim 62, wherein said third set of instructions comprises:
a first subset of instructions, executable on said computer system, configured to determine if an ingress port is marked as an access port; and
a second subset of instructions, executable on said computer system, configured to set a security level of said ingress port to said first security level, if said ingress port is marked as an access port.

65. The computer program product of claim 64, further comprising:
a fifth set of instructions, executable on said computer system, configured to set said first security level information to said security level of said ingress port.

66. The computer program product of claim 51, further comprising:
a third set of instructions, executable on said computer system, configured to perform said processing on said packet based on a result generated by said first set of instructions.

67. The computer program product of claim 66, wherein said third set of instructions comprises:
a first subset of instructions, executable on said computer system, configured to perform said forwarding of said packet, if said second set of instructions indicates that said packet is allowed to be forwarded; and
a second subset of instructions, executable on said computer system, configured to drop said packet, otherwise.

68. The computer program product of claim 51, further comprising:
a third set of instructions, executable on said computer system, configured to strip network security information from said packet; and
a fourth set of instructions, executable on said computer system, configured to add subnetwork security information to said packet.

69. A network device comprising:
a network interface, wherein
said network interface is configured to receive a packet, and
said network device is configured to store first security level information,
compare said first security level information and second security level information, wherein
said first security level information is stored in a security label of a packet received at a network node of a network,
said first security level information represents a first security level,
said first security level is a security level of a source of said packet,
said second security level information is stored at said network node,
said second security level information is received from another network node of said network as a result of said second security level information being registered in a context,
said second security level information is configured to be updated by virtue of said second security level information being configured to be combined with third security level information,
said second security level information represents a second security level,
said second security level is a security level of a destination of said packet,
said network comprises a plurality of network nodes,
said network nodes comprise said network node and said another network node, and
said network nodes are configured to convey packets to one another via others of said network nodes, and
indicate processing to be performed on said packet based on said comparing, wherein said processing comprises
    determining whether to forward said packet from said network node to one of said network nodes, and
perform said processing of said packet.

70. The network device of claim 69, wherein
said network interface comprises a port, and
said port is configured to store said first security level information.

71. The network device of claim 70, wherein
said port is an egress port.

72. The network device of claim 70, wherein
said network device is further configured to set a security level of said port.

73. The network device of claim 69, wherein
said network device is further configured to process said packet based on said comparing.

74. The network device of claim 69, wherein
said network device is further configured to strip network security information from said packet and add subnetwork security information to said packet.

75. The network device of claim 69, wherein
said first security level is a security level of a port of said network device.

76. The network device of claim 69, wherein
said second security level information represents a second security level, and
said first security level information represents a plurality of security levels.

77. The network device of claim 76, wherein
said security levels are a range of security levels.

78. The network device of claim 69, wherein
said network device is further configured to store said first security level information at said network device.

79. The network device of claim 78, wherein
said network device is further configured to communicate said first security level from a second network device by registering said first security level in a context.

80. The network device of claim 79, wherein
said context is a generic attribute registration protocol information propagation context, and
said registering said first security level is accomplished by said second network device issuing a join request.

81. A network device comprising:
a content-addressable memory; and
an access control list, wherein
    said content-addressable memory is configured to store said access control list,
    said access control list comprises an access control list entry,
    said access control list entry comprises a label information field,
    said label information field is configured to store a security label, and
    said network device is configured to
        compare first security level information and second security level information, wherein
            said first security level information is stored in a security label of a packet received at a network node of a network,
            said first security level information represents a first security level,
            said first security level is a security level of a source of said packet,
            said second security level information is stored at said network node,
            said second security level information is received from another network node of said network as a result of said second security level information being registered in a context,
            said second security level information is configured to be updated by virtue of said second security level information being configured to be combined with third security level information,
            said second security level information represents a second security level,
            said second security level is a security level of a destination of said packet,
            said network comprises a plurality of network nodes,
            said network nodes comprise said network node and said another network node, and said network nodes are configured to convey packets to one another via others of said network nodes; and
        indicate processing to be performed on said packet based on said comparing, wherein
            said processing comprises
                determining whether to forward said packet from said network node to one of said network nodes.

82. The network device of claim 81, wherein
said security label implements a multi-level security paradigm.

83. The network device of claim 81, wherein
said security label implements a multi-lateral security paradigm.

84. The network device of claim 81, wherein said access control list entry further comprises:
a flow label field, wherein
    said flow label field allows said access control list entry to be identified as a security labeled access control list entry.

85. The network device of claim 84, wherein said access control list entry further comprises:
a plurality of flow specification fields, wherein
    said flow specification fields comprise information identifying processing to be performed on at least one flow.

86. The network device of claim 81, wherein said security label is configured to be compared to a security label of a packet.

87. The network device of claim 86, wherein said access control list entry further comprises:
a flow specification field, wherein
    said flow specification field comprise information identifying processing to be performed on said packet.

88. The network device of claim 87, wherein said access control list entry further comprises:
a flow label field, wherein
    said flow label field allows said access control list entry to be identified as a security labeled access control list entry.

89. A network device comprising:
a forwarding table, wherein
    said forwarding table comprises a plurality of forwarding table entries,
    at least one forwarding table entry of said forwarding table entries comprises a label range field, and
    said network device is configured to compare first security level information and second security level information, wherein said first security level information is stored in a security label of a packet received at a network node of a network, said first security level information represents a first security level, said first security level is a security level of a source of said packet, said second security level information is stored at said network node, said second security level information is received from another network node of said network as a result of said second security level information being registered in a context, said second security level information is configured to be updated by virtue of said second security level information being configured to be combined with third security level information, said second security level information represents a second security level, said second security level is a security level of a destination of said packet, said network comprises a plurality of network nodes, said network nodes comprise said network node and said another network node, and said network nodes are configured to convey packets to one another via others of said network nodes; and indicate processing to be performed on said packet based on said comparing, wherein said processing comprises determining whether to forward said packet from said network node to one of said network nodes.

90. The network device of claim 89, wherein said at least one forwarding table entry further comprises:

a port identifier field, wherein a port identifier stored in said port identifier field identifies a port.

91. The network device of claim 90, wherein a security label stored in said label range field is associated with said port.

92. The network device of claim 90, wherein said at least one forwarding table entry further comprises:

a media access control (MAC) address field; and a virtual local area network (VLAN) identifier field, wherein a combination of said MAC address field and said VLAN identifier field are associated with said port identifier field and said label range field.

93. The network device of claim 92, wherein said address field is configured to store a MAC address, said VLAN identifier field is configured to store a VLAN identifier, said VLAN identifier identifies a VLAN, and a combination of said MAC address and said VLAN identifier identify said port and said security label.

94. The network device of claim 91, wherein said at least one forwarding table entry further comprises:

a media access control (MAC) address field configured to store a MAC address, wherein said MAC address is associated with a security label stored in said label range field.

95. The network device of claim 89, wherein said at least one forwarding table entry further comprises:

a virtual local area network (VLAN) identifier field, wherein a VLAN identifier stored in said VLAN identifier field identifies a VLAN, and said VLAN is associated with a security label stored in said label range field.

* * * * *